(12) United States Patent
Nakajima

(10) Patent No.: US 10,145,995 B2
(45) Date of Patent: Dec. 4, 2018

(54) NEAR-INFRARED REFLECTIVE FILM HAVING ADJACENT FIRST AND SECOND DIELECTRIC FILM GROUPS AND NEAR-INFRARED REFLECTIVE GLASS USING SAME

(71) Applicant: Konica Minolta, Inc., Tokyo (JP)

(72) Inventor: Akihisa Nakajima, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 626 days.

(21) Appl. No.: 14/380,619

(22) PCT Filed: Feb. 25, 2013

(86) PCT No.: PCT/JP2013/054809
§ 371 (c)(1),
(2) Date: Aug. 22, 2014

(87) PCT Pub. No.: WO2013/129335
PCT Pub. Date: Sep. 6, 2013

(65) Prior Publication Data
US 2015/0015940 A1     Jan. 15, 2015

(30) Foreign Application Priority Data

Feb. 29, 2012   (JP) ................. 2012-044293

(51) Int. Cl.
*G02B 5/20*     (2006.01)
*G02B 5/22*     (2006.01)
(Continued)

(52) U.S. Cl.
CPC ............. *G02B 5/208* (2013.01); *B32B 7/02* (2013.01); *B32B 27/08* (2013.01); *B32B 27/18* (2013.01);
(Continued)

(58) Field of Classification Search
CPC ........ B32B 17/10174; B32B 17/10201; B32B 17/10238; B32B 17/10431;
(Continued)

(56) References Cited

U.S. PATENT DOCUMENTS 6,391,400 B1 * 5/2002 Russell .................. B32B 17/10
296/84.1
2004/0202897 A1   10/2004 Kondo
(Continued)

FOREIGN PATENT DOCUMENTS

CN         104040384 A    9/2014
EP           2799917 A1   11/2014
(Continued)

OTHER PUBLICATIONS

Extended European Search Report dated Sep. 1, 2015, in corresponding European Patent Application No. 13754490.4 (8 pages).
(Continued)

*Primary Examiner* — Stephone B Allen
*Assistant Examiner* — Ryan S Dunning
(74) *Attorney, Agent, or Firm* — Osha Liang LLP

(57) ABSTRACT

Provided is a near-infrared reflective film that suppresses reflection peaks such as ripples that can arise in the visible region and shows an excellent reflection peak in the near-infrared region; the near-infrared reflective film having a support and a dielectric multilayer film disposed on the support, in which a high-refractive index layer and a low-refractive index layer are alternately layered, wherein any of the high-refractive index layer and the low-refractive index layer adjacent to said high-refractive index layer satisfy predetermined conditions.

20 Claims, 10 Drawing Sheets

(51) Int. Cl.
  *B32B 7/02* (2006.01)
  *B32B 27/08* (2006.01)
  *B32B 27/18* (2006.01)
  *B32B 27/28* (2006.01)
  *B32B 27/30* (2006.01)
  *B32B 27/32* (2006.01)
  *B32B 27/34* (2006.01)
  *B32B 27/36* (2006.01)
  *G02B 5/28* (2006.01)
  *B32B 17/10* (2006.01)

(52) U.S. Cl.
  CPC ............ *B32B 27/281* (2013.01); *B32B 27/30* (2013.01); *B32B 27/32* (2013.01); *B32B 27/34* (2013.01); *B32B 27/36* (2013.01); *B32B 27/365* (2013.01); *G02B 5/282* (2013.01); B32B 17/10449 (2013.01); B32B 2250/05 (2013.01); B32B 2255/10 (2013.01); B32B 2255/20 (2013.01); B32B 2255/205 (2013.01); B32B 2264/102 (2013.01); B32B 2307/202 (2013.01); B32B 2307/306 (2013.01); B32B 2307/412 (2013.01); B32B 2307/416 (2013.01); B32B 2307/418 (2013.01); B32B 2307/516 (2013.01); B32B 2307/518 (2013.01); B32B 2307/732 (2013.01); B32B 2419/00 (2013.01); B32B 2605/00 (2013.01); G02B 5/285 (2013.01)

(58) Field of Classification Search
  CPC ........ B32B 17/10449; B32B 17/10633; B32B 2307/42; C03C 17/3411; C03C 17/3417; G02B 5/208; G02B 5/26; G02B 5/281; G02B 5/282; G02B 5/285; G02B 5/287; G02B 5/289
  USPC .......... 252/587; 264/1.24, 1.7, 1.9; 359/359, 359/360, 580, 584, 585, 586, 588, 589, 359/590, 592, 593, 594, 597, 609; 427/163.1, 163.2, 164, 165
  See application file for complete search history.

(56) References Cited

U.S. PATENT DOCUMENTS

| 2005/0041293 A1* | 2/2005 | Wada | G02B 5/208 |
| | | | 359/586 |
| 2010/0073764 A1* | 3/2010 | Kai | G02B 5/22 |
| | | | 359/359 |
| 2013/0114132 A1 | 5/2013 | Nakajima et al. | |

FOREIGN PATENT DOCUMENTS

| JP | S56-165105 A | 12/1981 |
| JP | H05-3023 A | 1/1993 |
| JP | H06-194517 A | 7/1994 |
| JP | 2003-267754 A | 9/2003 |
| JP | 2004-309934 A | 11/2004 |
| JP | 2010-175838 A | 8/2010 |
| WO | 2012/014644 A1 | 2/2012 |

OTHER PUBLICATIONS

First Office Action issued in corresponding Chinese Application No. 201380011536.7, dated Nov. 4, 2015 (14 pages).

International Search Report issued in corresponding International Patent Application No. PCT/JP2013/054809 dated May 28, 2013 (4 pages).

Written Opinion of the International Searching Authority issued in corresponding International Patent Application No. PCT/JP2013/054809 dated May 28, 2013 (10 pages).

International Preliminary Report on Patentability issued in corresponding International Patent Application No. PCT/JP2013/054809 dated Sep. 12, 2014 (2 pages).

Second Office Action issued in corresponding Chinese Application No. 201380011536.7, dated Jun. 27, 2016 (13 pages).

* cited by examiner

NEAR-INFRARED REFLECTIVE FILM HAVING ADJACENT FIRST AND SECOND DIELECTRIC FILM GROUPS AND NEAR-INFRARED REFLECTIVE GLASS USING SAME

TECHNICAL FIELD

The present invention relates to an infrared reflective film and a near-infrared reflective glass using this.

BACKGROUND

Light emitted from the sun has a wide variety of spectra from the ultraviolet region to the infrared ray region. Of these, infrared ray accounts for about 50% of solar light, and said infrared ray is mainly classified into near-infrared ray whose wavelength is close to that of visible ray (wavelength: about 750 to 2,500 nm), middle-infrared ray having a wavelength equal to or more than that wavelength (about 2,500 to 4,000 nm) and far-infrared ray (wavelength: about 4,000 nm or more). Such infrared rays (especially near-infrared ray) have longer wavelengths than that of ultraviolet light, and thus have small energy, whereas the infrared rays have significant thermal actions, and when the infrared rays are absorbed by a substance, they are emitted as heat to thereby cause temperature rising. Accordingly, infrared ray is also called heat ray, and by reflecting infrared ray (especially, near-infrared ray), for example, indoor temperature rising can be suppressed.

In recent years, due to increase of interest in countermeasures for energy saving, an attempt is made to decrease loads on cooling instillation by attaching a film that reflects the above-mentioned near-infrared rays onto windowpanes of buildings or vehicles to reflect the transmission of heat ray from solar light. On the other hand, if such near-infrared reflective film also reflects visible ray, which has a wavelength that is close to that of near-infrared ray, the transparency of the film cannot be ensured, and thus the film is colored. Accordingly, a near-infrared reflective film that selectively reflects near-infrared ray but transmits visible ray is considered to be preferable.

As such near-infrared reflective film that can selectively reflect near-infrared ray and transmit visible ray, for example, Patent Literature 1 discloses a near-infrared ray reflective substrate in which a near-infrared ray reflective film including low-refractive index dielectric films and high-refractive index dielectric films that are alternately layered is formed on a transparent sheet glass. The above-mentioned near-infrared ray reflective film is characterized in that 4 or more and 11 or less dielectric films are layered on at least one surface, and the visible ray transmittance defined in JIS R3106-1998 of the sheet glass on which the near-infrared ray reflective film is formed is 70% or more and has a maximum value of reflection of more than 50% in the wavelength region of wavelengths of from 900 nm to 1,400 nm. Furthermore, said near-infrared ray reflective film satisfies the following conditions: (1) when the dielectric films are sequentially counted from the surface of the sheet glass, and the maximum value among the refractive indices of the even-numbered layers is defined as $n_{emax}$ and the minimum value is defined as $n_{emin}$, and the maximum value among the refractive indices of the odd-numbered layers is defined as $n_{omax}$ and the minimum value is defined as $n_{omin}$, $n_{emax} < n_{omin}$ or $n_{omax} < n_{emin}$, and (2) when the refractive index of the $i^{th}$ layer is defined as $n_i$ and the thickness is defined as $d_i$, 225 nm $\leq n_i \cdot d_i \leq$ 350 nm with respect to infrared ray having a wavelength $\lambda$ in the range of from 900 to 1,400 nm.

As is also described in paragraphs "0029" and "0030" of the above-mentioned Patent Literature 1, it is possible to reflect near-infrared ray by providing a structure in which low-refractive index dielectric films and high-refractive index dielectric films are alternately layered to thereby cause interference among the dielectric films (the above-mentioned condition (1)). Furthermore, in order to reflect near-infrared ray at a desired wavelength (900 to 1,400 nm), it is important to adjust the optical path difference (optical film thickness) $n_i \cdot d_i$ to be ¼ of the above-mentioned desired wavelength (the above-mentioned condition (2)).

In the near-infrared reflective film (near-infrared reflective film) described in Patent Literature 1, a sharp reflection peak appears in the near-infrared region, but reflection peaks (especially peaks so-called ripples, which are repeating of high reflection and low reflection depending on wavelengths) sometimes appear also in the visible region. Therefore, reflection arises not only for near-infrared ray but also for visible ray, and thus, in some cases, the transparency of the infrared reflective film cannot be sufficiently ensured.

Therefore, methods for preventing the arising of reflection peaks that can arise in the visible region while retaining a reflection peak in the near-infrared region have been considered. For example, Patent Literature 2 discloses an infrared ray cut filter in which plural high-refractive index thin films formed of a high-refractive index material and plural low-refractive index thin films formed of a low-refractive index material are alternately layered is formed on a transparent substrate. At this time, the above-mentioned multilayer film is constituted by 16 or more and 32 or less of the above-mentioned thin film layers, and the first layer from the side of the above-mentioned transparent substrate of the above-mentioned multilayer film is the above-mentioned high-refractive index thin film, and the final layer of the above-mentioned multilayer film is the above-mentioned low-refractive index thin film. Furthermore, when a designed wavelength is defined $\lambda$, as the multilayer film is characterized in that the first and the second layers from the side of the above-mentioned transparent substrate of the above-mentioned multilayer film are formed by optical film thicknesses of ($\lambda$/4) or more, and the third to the predetermined layer from the side of the above-mentioned transparent substrate of the above-mentioned multilayer film are formed by optical film thicknesses of ($\lambda$/4) or less, the layers between the above-mentioned predetermined layer and the above-mentioned final layer are formed by optical film thicknesses of ($\lambda$/4) or more, and the above-mentioned final layer is formed by an optical film thickness of ($\lambda$/4) or less. Specifically, the multilayer film that constitutes the infrared ray cut filter is divided into four layer groups, and the values of the optical film thicknesses are shifted from $\lambda$/4 for the respective four layer groups. According to the infrared ray cut filter of Patent Literature 2, the literature describes that a transmittance property in which the transmittance gradually decreases at wavelengths from 550 nm to 750 nm can be obtained, and ripples that can arise in the visible region can be suppressed.

CITATION LIST

Patent Literature

Patent Literature 1: Japanese Patent Application Laid-Open (JP-A) No. H06-194517
Patent Literature 2: JP-A No. 2004-309934

SUMMARY

Technical Problem

According to the near-infrared ray reflective substrate described in the above-mentioned Patent Literature 1, a sharp near-infrared reflection peak can be obtained, but ripples can arise. Furthermore, according to the infrared ray cut filter described in the above-mentioned Patent Literature 2, ripples can be suppressed, but the filter has a transmittance property in which the transmittance gradually decreases at wavelengths from 550 nm to 750 nm, and thus becomes a reddish film, and the ripples suppression effect cannot be necessarily considered to be sufficient in some cases.

Therefore, the object of the present invention is to provide a near-infrared reflective film that suppresses reflection peaks such as ripples that can arise in the visible region, and shows an excellent reflection peak in the near-infrared region.

Solution to Problem

The present inventors conducted intensive studies, and consequently found that a near-infrared reflective film that shows preferable reflection peaks can be obtained by shifting the optical film thicknesses of the high-refractive index layers and low-refractive index layers that constitute the near-infrared reflective film, and by controlling the thicknesses of the high-refractive index layers and low-refractive index layers, whereby the present invention was completed.

Specifically, the above-mentioned object of the present invention is achieved by the following means.

(1) A near-infrared reflective film having a support, and a dielectric multilayer film disposed on the support, in which a high-refractive-index layer and a low-refractive-index layer are alternately layered, wherein any of the high-refractive index layer and the low-refractive index layer adjacent to said high-refractive index layer satisfy:

$$1.1 \geq (dH \times nH)/(dL \times nL) > 1 \text{ or}$$

$$1 > (dH \times nH)/(dL \times nL) \geq 0.9, \quad \text{[Mathematical Formula 1]}$$

wherein dH represents the thickness of the high-refractive index layer, nH represents the refractive index of the high-refractive-index layer, dL represents the thickness of the low-refractive index layer, nL represents the refractive index of the low-refractive index layer, dH×nH represents the optical film thickness of the high-refractive index layer, and dL×nL represents the optical film thickness of the low-refractive index layer, and the dielectric multilayer film has a dielectric film group set including a first dielectric film group containing at least three high-refractive index layers (refractive index $n_1H$, thickness $d_1H$) and at least three low-refractive index layers (refractive index $n_1L$, thickness $d_1L$), respectively, and a second dielectric film group including at least three high-refractive index layers (refractive index $n_2H$, thickness $d_2H$) and at least three low-refractive index layers (refractive index $n_2L$, thickness $d_2L$), respectively, which is adjacent to the opposite surface of the support of the first dielectric film group, wherein the dielectric film group set satisfies:

$$1.10 \geq d_2H/d_1H > 1 \text{ and}$$

$$1.10 \geq d_2L/d_1L > 1; \quad \text{[Mathematical Formula 2]}$$

(2) the near-infrared reflective film according to (1), wherein the optical film thickness of the high-refractive index layer ($d_1H \times n_1H$) and the optical film thickness of the low-refractive index layer ($d_1L \times n_1L$) of the first dielectric film group satisfy:

$$1.06 \geq (d_1H \times n_1H)/(d_1L \times n_1L) > 1 \text{ or}$$

$$1 > (d_1H \times n_1H)/(d_1L \times n_1L) \geq 0.94, \quad \text{[Mathematical Formula 3]}$$

and/or the optical film thickness of the high-refractive index layer ($d_2H \times n_2H$) and the optical film thickness of the low-refractive index layer ($d_2L \times n_2L$) of the second dielectric film group satisfy:

$$1.06 \geq (d_2H \times n_2H)/(d_2L \times n_2L) > 1 \text{ or}$$

$$1 > (d_2H \times n_2H)/(d_2L \times n_2L) \geq 0.94; \quad \text{[Mathematical Formula 4]}$$

(3) the near-infrared reflective film according to (1) or (2), wherein the optical film thickness of the high-refractive index layer ($d_1H \times n_1H$) of the first dielectric film group and the optical film thickness of the high-refractive index layer ($d_2H \times n_2H$) of the second dielectric film group satisfy:

$$1.10 \geq (d_2H \times n_2H)/(d_1H \times n_1H) > 1.06, \quad \text{[Mathematical Formula 5]}$$

and/or the optical film thickness of the low-refractive index layer ($d_1L \times n_1L$) of the first dielectric film group and the optical film thickness of the low-refractive index layer ($d_2L \times n_2L$) of the second dielectric film group satisfy:

$$1.10 \geq (d_2L \times n_2L)/(d_1L \times n_1L) > 1.06; \quad \text{[Mathematical Formula 6]}$$

(4) the near-infrared reflective film according to any one of (1) to (3), which has two or more of the dielectric film group sets;

(5) the near-infrared reflective film according to any one of (1) to (4), wherein the ratio of the refractive index nH of any of the high-refractive index layers to the refractive index nL of at least one of the low-refractive index layers adjacent to said high-refractive index layer satisfy:

$$2 > nH/nL \geq 1.1; \quad \text{[Mathematical Formula 7]}$$

(6) the near-infrared reflective film according to any one of (1) to (5), wherein the dielectric multilayer film contains a resin;

(7) the near-infrared reflective film according to (6), wherein the dielectric multilayer film further contains metal oxide particles;

(8) a near-infrared reflective glass being formed by the near-infrared reflective film according to any one of (1) to (7), which is laminated to the surface of the glass plate.

Advantageous Effects of Invention

According to the present invention, a near-infrared reflective film that suppresses reflection peaks such as ripples that can arise in the visible region, and shows an excellent reflection peak in the near-infrared region can be provided.

DESCRIPTION OF EMBODIMENTS

An exemplary embodiment of the present invention relates to a near-infrared reflective film having a support, and a dielectric multilayer film disposed on the support, in which a high-refractive-index layer and a low-refractive-index layer are alternately layered. At this time, the near-infrared reflective film is characterized in that any of the high-refractive index layer and the low-refractive index layer adjacent to said high-refractive index layer satisfy:

$$1.1 \geq (dH \times nH)/(dL \times nL) > 1 \text{ or}$$

$$1 > (dH \times nH)/(dL \times nL) \geq 0.9, \quad \text{[Mathematical Formula 8]}$$

wherein, in the above-mentioned formulas, dH represents the thickness of the high-refractive index layer, nH represents the refractive index of the high-refractive-index layer, dL represents the thickness of the low-refractive index layer, nL represents the refractive index of the low-refractive index layer, dH×nH represents the optical film thickness of the high-refractive index layer, and dL×nL represents the optical film thickness of the low-refractive index layer.

Furthermore, the dielectric multilayer film has a dielectric film group set including a first dielectric film group including at least three high-refractive index layers (refractive index $n_1H$, thickness $d_1H$) and at least three low-refractive index layers (refractive index $n_1L$, thickness $d_1L$), respectively, and a second dielectric film group including at least three high-refractive index layers (refractive index $n_2H$, thickness $d_2H$) and at least three low-refractive index layers (refractive index $n_2L$, thickness $d_2L$), respectively, which is adjacent to the opposite surface of the support of the first dielectric film group, wherein the dielectric film group set satisfies:

$$1.10 \geq d_2H/d_1H > 1 \text{ and}$$

$$1.10 \geq d_2L/d_1L > 1. \quad \text{[Mathematical Formula 9]}$$

Hereinbelow, the preset embodiments will be explained, but the technical scope of the present invention should be defined based on the recitation of the claims, and thus is not limited to only the following embodiments. The size ratios on the drawings are exaggerated for the convenience of explanation, and are different from actual ratios in some cases.

<Near-Infrared Reflective Film>

Figure 1:
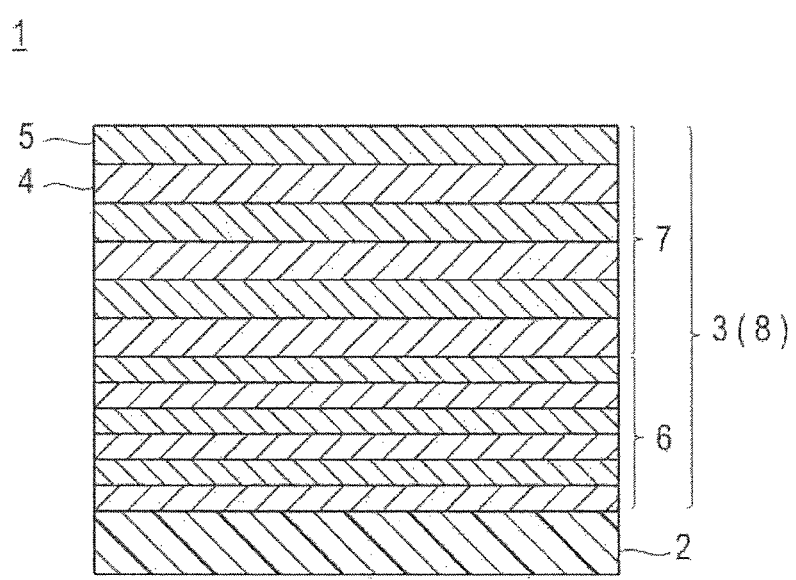
FIG. 1 is a cross-sectional schematic diagram that schematically represents a near-infrared reflective film according to an exemplary embodiment.

FIG. 1 is a cross-sectional schematic diagram that schematically represents a near-infrared reflective film according to an exemplary embodiment. According to FIG. 1, near-infrared reflective film 1 is such that a dielectric multilayer film 3 is disposed on a support 2 formed of a polycarbonate. At this time, the above-mentioned dielectric multilayer film 3 has a constitution in which low-refractive index layers 4 formed by sputtering magnesium fluoride ($MgF_2$) and high-refractive index layers 5 formed by sputtering titanium oxide ($TiO_2$), 12 layers in total, are alternately layered. Therefore, the odd-numbered layers counted from the support 2 are the low-refractive index layers 4 and the even-numbered layers are the high-refractive index layers 5. The refractive index of the above-mentioned low-refractive index layer (nL) is 1.33, the refractive index of the above-mentioned high-refractive-index layer (nH) is 2.70, and the thickness of the above-mentioned low-refractive index layer (nL) is 197 nm for the first, third and fifth layers counted from the support 2, and 211 nm for the seventh, ninth and eleventh layer. On the other hand, the thickness of the above-mentioned high-refractive index layer (dH) is the support 2, and 109 nm for the eighth, tenth and twelfth layers. At this time, with respect to the optical film thicknesses of any of the high-refractive index layers and the low-refractive index layer adjacent to said high-refractive index layer, for example, the optical film thicknesses of the second high-refractive index layer and the third low-refractive index layer counted from the support (refractive index×thickness), the optical film thickness of the high-refractive index layer (nH×dH) is 275, and the optical film thickness of the low-refractive index layer (nL×dL) is 262, and thus the ratio thereof (nH×dH)/(nL×dL) is 1.05. Furthermore, with respect to the optical film thicknesses of the eighth high-refractive index layer and the optical film thickness of the ninth low-refractive index layer counted from the support (refractive index×thickness), the optical film thickness of the high-refractive index layer (nH×dH) is 294, and the optical film thickness of the low-refractive index layer (nL×dL) is 281, and thus the ratio thereof (nH×dH)/(nL×dL) is 1.05.

Furthermore, the above-mentioned dielectric multilayer film has dielectric film group set 8 including two dielectric film groups, i.e., (1) first dielectric film group 6, in which three high-refractive index layers having the same refractive index ($n_1H$: 2.70) and thickness ($d_1H$: 102 nm), and three low-refractive index layers having the same refractive index ($n_1L$: 1.33) and thickness ($d_1L$: 197 nm) are respectively layered, and (2) second dielectric film group 7 adjacent to the opposite surface of the support of the above-mentioned first dielectric film group, in which three high-refractive index layers having the same refractive index ($n_2H$: 2.70) and thickness ($d_2H$: 109 nm), and three low-refractive index layers having the same refractive index ($n_2L$: 1.33) and thickness ($d_2L$: 211 nm) are respectively layered. At this time, in the above-mentioned dielectric film group set 8, the ratio of the thicknesses between the high-refractive index layers of the first dielectric film group 6 and second dielectric film group 7 ($d_2H/d_1H$) is 1.07, and the ratio of the thicknesses between the low-refractive index layers ($d_2L/d_1L$) is 1.07.

Furthermore, when the relationship between the first dielectric film group and second dielectric film group that constitute the dielectric film group set 8 is considered, the ratio of the optical film thickness of the high-refractive index layer of second dielectric film group to the optical film thickness of the high-refractive index layer of the first dielectric film group ($d_2H \times n_2H/d_1H \times n_1H$) is 1.07, and the ratio of the optical film thickness of the low-refractive index layer of the second dielectric film group to the optical film thickness of the low-refractive index layer of the first dielectric film group ($d_2L \times n_2L/d_1L \times n_1L$) is 1.07.

According to the near-infrared reflective film 1 of FIG. 1, reflection peaks such as ripples that can arise in the visible region can be suppressed, and an excellent reflection peak in the near-infrared region can be shown.

Hereinbelow, the respective constitutions in the near-infrared reflective film of the present embodiment will be explained in detail.

<Support>

The support to be applied to the infrared reflective film of the present invention is not especially limited as long as it is transparent, and known resin films can be used. Specific examples include polyethylenes (PE), polypropylenes (PP), polystyrenes (PS), polyarylates, polymethyl methacrylates, polyamides, polycarbonates (PC), polyethylene terephthalates (PET), polybutylene terephthalates (PBT), polyethylene naphthalates (PEN), polysulfones, polyethersulfones, polyether ether ketones, polyimides, aromatic polyamides and polyetherimides. Among these, polyethylene terephthalates (PET), polyethylene naphthalates (PEN), polycarbonates (PC) and the like are preferably used in view of costs and easiness in obtainability Furthermore, the support has a transmittance in the visible region represented by JIS R3106-1998 of preferably 85% or more, and more preferably 90% or more. When the visible ray transmittance of the support is 85% or more, it is preferable since when a near-infrared reflective film is formed, the film has a transmittance in the visible region represented by JIS R3106-1998 of 50% or more.

Furthermore, the support using the above-mentioned resin film may be either an unstretched film or a stretched film, but in the case of a resin film having crystallinity such as PET and PEN, a film that is stretched and then fixed by heat is preferable in view of improvement of strength and suppression of thermal inflation.

The support using the above-mentioned resin film can be produced by a conventionally-known general method. For example, a resin as a material is molten by an extruder, extruded by a ring-shaped die or a T-die, and rapidly cooled, whereby a substantially amorphous and non-oriented, unstretched film can be produced. Furthermore, a stretched film can be produced by stretching the above-mentioned unstretched film in the flow (longitudinal axis) direction of the resin film and/or the direction orthogonal (transverse axis) to the flow direction of the resin film, by a known method such as monoaxial stretching, tenter-type sequential biaxial stretching, tenter-type simultaneous biaxial stretching or tubular-type simultaneous biaxial stretching. The stretching ratio in this case can be suitably selected depending on the resin as a raw material of the support, and is preferably 2 to 10-times in the longitudinal axis direction and transverse axis direction, respectively.

The support in the present invention has a thickness of preferably 5 to 300 µm, more preferably 15 to 150 µm. Furthermore, the support may be such that two or more supports are superposed, and in such case, the kinds of the supports may be the same or different.

Furthermore, the support may be subjected to a relaxation treatment and an offline heat treatment in view of size stability. The relaxation treatment is preferably conducted by conducting the thermal fixing in the above-mentioned step of forming a film by stretching the resin film, and then conducting steps up to the rolling up of the resin film in the tenter for transverse stretching, or after ejecting from the tenter. The relaxation treatment is conducted at a treatment temperature of preferably 80 to 200° C., and more preferably 100 to 180° C. Furthermore, the treatment is conducted at a relaxation ratio of preferably 0.1 to 10%, and more preferably 2 to 6%, in both the longitudinal direction and width direction. By further subjecting the relaxation-treated support to an offline heat treatment, the heat-resistance can be improved, and the size stability can further be improved.

It is preferable to dispose primer layer(s) on one or both surface(s) of the above-mentioned support in the process of film formation. Said primer layer (s) can be formed in-line, or after the film formation. Examples of the method for forming the primer layer(s) include a method including applying a primer layer application liquid, and drying the obtained coating. The primer layer application liquid generally contains a resin. Examples of the resin include polyester resins, acrylic-modified polyester resins, polyurethane resins, acrylic resins, vinyl resins, vinylidene chloride resins, polyethyleneimine-vinylidene resins, polystyrene-butadiene resins, polyethyleneimine resins, polyvinyl alcohols and gelatins. Known additives may further be added to the above-mentioned primer layer application liquid. The primer layer application liquid is preferably applied so that the application amount becomes about 0.01 to 2 $g/m^2$ in a dried state. The method for applying the primer layer application liquid is not especially limited, and known methods such as a roll coat process, a gravure coat process, a knife coat process, a dip coat process and a spray coat process can be used. The obtained coating may be stretched, and the primer layer can be generally formed by applying the application liquid, and drying the application liquid at 80 to 120° C. while transverse stretching is conducted in a tenter. The primer layer may be either a monolayer structure or a layered structure.

The support in the present invention may further have known functional layers such as an electroconductive layer, an antistatic layer, a gas barrier layer, an easy adhesion layer (adhesive layer), an antifouling layer, an odor eliminating layer, a dripping layer, a slipping layer, a hard coat layer, an antiwearing layer, an antireflective layer, an electromagnetic wave-shielding layer, a UV absorbing layer, an infrared absorbing layer, a print layer, a fluorescent layer, a hologram layer, a peeling layer, a sticky layer, a colored layer (visible ray absorbing layer) and a medium film layer utilized in laminated glass.

In the case when the support has a medium layer such as the above-mentioned primer layer and functional layer, the total film thickness of the support and medium layer is preferably 5 to 500 µm, and more preferably 25 to 250 µm.

<Dielectric Multilayer Film>

The dielectric multilayer film has a constitution in which a high-refractive index layer and a low-refractive index layer are alternately layered. By providing a constitution in which refractive index layers having different refractive indices are alternately layered, in the case when near-infrared ray is irradiated from the side of the substrate or the side of the dielectric multilayer film, the dielectric multilayer film can reflect at least a part of the infrared ray to thereby exert an infrared reflection effect.

[Refractive Index Layers: High-Refractive Index Layer and Low-Refractive Index Layer]

In the present embodiment, the dielectric multilayer film is formed by alternately layering a high-refractive index layer and a low-refractive index layer having different refractive indices. The high-refractive index layer and low-refractive index layer that constitute the dielectric multilayer film may be respectively the same or different. Whether the refractive index layer that constitutes the dielectric multilayer film is a high-refractive index layer or a low-refractive index layer is judged by comparing the refractive index with that of the adjacent refractive index layer. Specifically, when a certain refractive index layer is defined as a criterion layer, if the refractive index layer adjacent to the criterion layer has a lower refractive index than that of the criterion layer, then the criterion layer is judged to be a high-refractive index layer (the adjacent layer is a low-refractive index layer). On the other hand, if the adjacent layer has a higher refractive index than that of the criterion layer, then the criterion layer is judged to be a low-refractive index layer (the adjacent layer is a high-refractive index layer). Therefore, whether the refractive index layer is a high-refractive index layer or a low-refractive index layer is relative since it is determined by the relationship with the refractive index that the adjacent layer has, and thus a certain refractive index layer may be either a high-refractive index layer or a low-refractive index layer depending on the relationship with the adjacent layer. Therefore, the constitutions of the refractive index layers that may include the both will be explained below in detail.

The refractive index layer is not especially limited, and preferably, it is preferable to use known refractive index layer used in the art Examples of the known refractive index layer include refractive index layer formed by using a dry film formation process, refractive index layer formed by injection molding of a resin, and refractive index layer formed by a wet film formation process.

(Refractive Index Layer Formed by Dry Film Formation Process)

In the dry film formation process, refractive index layer can be formed by the deposition and the like of a dielectric material.

The material that can be used in the dry film formation process is not especially limited, and is preferably a transparent dielectric material. Examples of the transparent dielectric material include titanium oxide ($TiO_2$), zinc oxide (ZnO), zirconium oxide ($ZrO_2$), niobium oxide ($Nb_2O_5$) aluminum oxide ($Al_2O_3$), silicon oxide ($SiO_2$), calcium fluoride ($CaF_2$), magnesium fluoride ($MgF_2$), indium tin oxide (ITO) and antimony tin oxide (ATO). Among these, titanium oxide, zinc oxide, silicon oxide and magnesium fluoride are preferably used.

Preferable combinations of the materials for the high-refractive index layer-low-refractive index layer in the dry film formation process are titanium oxide-silicon oxide, titanium oxide-magnesium fluoride, and zinc oxide-silicon oxide.

(Refractive Index Layer Formed by Extrusion Molding of Resin)

Examples of the method for forming the refractive index layer formed by extrusion molding of a resin include a method including melting a resin to give a molten resin, extruding the obtained molten resin from a multilayer extrusion die onto a casting drum, and quenching the molten resin. At this time, after the extrusion cooling of the molten resin, the resin sheet may be stretched. The stretching ratio of the resin can be suitably selected depending on the resin, and is preferably 2 to 10 times in the longitudinal axis direction and traverse axis direction, respectively.

The above-mentioned resin is not especially limited as long as it is a thermoplastic resin, and examples include polyalkylene-based resins, polyester-based resins, polycarbonate-based resins, (meth)acrylic-based resins, amide-based resins, silicone-based resins and fluorine-based resins.

Examples of the above-mentioned polyalkylene-based resin include polyethylene (PE) and polypropylene (PP).

Examples of the above-mentioned polyester-based resin include polyester resins each containing a dicarboxylic acid component and a diol component as major constitutional components. At this time, examples of the above-mentioned dicarboxylic acid component include terephthalic acid, isophthalic acid, phthalic acid, 2,6-naphthalenedicarboxylic acid, 2,7-naphthalenedicarboxylic acid, diphenylsulfonedicarboxylic acid, diphenyl etherdicarboxylic acid, diphenylethanedicarboxylic acid, cyclohexanedicarboxylic acid, diphenyldicarboxylic acid, diphenylthioetherdicarboxylic acid, diphenylketonedicarboxylic acid and phenylindanedicarboxylic acid. Furthermore, examples of the above-mentioned diol components include ethylene glycol, propylene glycol, tetramethylene glycol, 1,4-butanediol, cyclohexanedimethanol, 2,2-bis(4-hydroxyphenyl)propane, 2,2-bis(4-hydroxyethoxyphenyl)propane, bis(4-hydroxyphenyl) sulfone, bisphenolfluorenedihydroxyethyl ether, diethylene glycol, neopentyl glycol, hydroquinone and cyclohexanediol. Among these, polyethylene terephthalate (PET), polybutylene terephthalate (PBT), poly-1,4-cyclohexanedimethylene terephthalate and polyethylene naphthalate (PEN) are preferable.

Examples of the above-mentioned polycarbonate-based resin include reaction products of a bisphenol such as bisphenol A or a derivative thereof and phosgene or phenyldicarbonate.

Examples of the above-mentioned (meth)acrylic-based resin include homopolymers or copolymers of acrylic acid, methacrylic acid, acrylonitrile, methacrylonitrile, methyl (meth)acrylate, ethyl (meth)acrylate, butyl(meth)acrylate, 2-ethylhexyl (meth)acrylate, cyclohexyl(meth)acrylate, benzyl (meth)acrylate, hydroxyethyl(meth)acrylate, 2-methoxyethyl(meth)acrylate, 2-ethoxyethyl (meth)acrylate, 2-butoxyethyl(meth)acrylate, (meth)acrylamide, N-methyl (meth)acrylamide, N-ethyl(meth)acrylamide, N,N-dimethyl (meth)acrylamide, N,N-diethyl(meth)acrylamide, N-isopropyl(meth)acrylamide and N-tert-octyl(meth)acrylamide.

Examples of the above-mentioned amide-based resin include aliphatic amide-based resins such as 6,6-nylon, 6-nylon, 11-nylon, 12-nylon, 4,6-nylon, 6,10-nylon and 6,12-nylon; and aromatic polyamides each formed of an aromatic diamine such as phenylenediamine and an aromatic dicarboxylic acid such as terephthaloyl chloride or isophthaloyl chloride or a derivative thereof.

Examples of the above-mentioned silicone-based resin include resins each containing a siloxane bond having an organic group such as an alkyl group or an aromatic group as a constitutional unit. The above-mentioned alkyl group is not especially limited, and examples include a methyl group, an ethyl group, a propyl group, an isopropyl group, a butyl group, an isobutyl group, a sec-butyl group, a tert-butyl group, a pentyl group and a hexyl group. The above-mentioned aromatic group is not especially limited, and examples include a phenyl group, a tolyl group, a xylyl group and a benzyl group. Among these, those having a methyl group and/or a phenyl group are preferable, and dimethylpolysiloxane, methylphenylpolysiloxane, diphenylpolysiloxane, and modified forms thereof are more preferable.

The above-mentioned fluorine-based resin include homopolymers or copolymers of tetrafluoroethylene, hexafluoropropylene, chlorotrofluoroethylene, vinylidene fluoride, vinyl fluoride and perfluoroalkyl vinyl ethers.

The above-mentioned resins may be used singly, or by mixing two or more kinds.

In the formation of refractive index layers using extrusion molding of a molten resin, preferable combinations of the materials for the high-refractive index layer-low-refractive index layer include PET-PEN and the like.

(Refractive Index Layer Formed by Using Wet Film Formation Process)

In the wet film formation process, refractive index layer can be formed by a method in which an application liquid is sequentially applied and dried, a method in which an application liquid is applied by multiple application and dried, or the like.

Examples of the material incorporated in the above-mentioned application liquid include resins.

The above-mentioned resins are not especially limited as long as they dissolve in a solvent, and examples include polyester-based resins, polycarbonate-based resins, (meth) acrylic-based resins, amide-based resins, silicone-based resins, fluorine-based resins, silicon-containing polymers, polyvinyl alcohols, polyvinyl pyrrolidone, polyethylene oxide, cellulose-based resins, gelatins and thickening polysaccharides.

Among the above-mentioned resins, specific examples of the resins that are preferably used are as follows.

Examples of the above-mentioned silicon-containing polymer include polycarbosilane, polyorganoborosilazane, polymetaloxane, polyborosiloxane and polycarbosilazane.

Examples of the above-mentioned polyvinyl alcohol include unmodified polyvinyl alcohols and modified polyvinyl alcohols.

The unmodified polyvinyl alcohols have an average polymerization degree of preferably from 200 to 4,000, more preferably from 500 to 3,000, and further preferably from 1,000 to 2,500 in view of flexibility and durability. Furthermore, the unmodified polyvinyl alcohols have a saponification degree of preferably from about 60 to 100 mol %, more preferably from 78 to 99.8 mol %, and further preferably from 80 to 96 mol %. Such saponified polyvinyl alcohol can be produced by radical-polymerizing vinyl acetate, and suitably saponifying the obtained polyvinyl acetate. At this time, a desired unmodified polyvinyl alcohol can be produced by suitably controlling the polymerization degree and saponification degree by methods known per se. As the above-mentioned partially-saponified polyvinyl alcohols, commercially available products may also be used. Examples of the commercially available unmodified polyvinyl alcohols include Gohsenol EG05 and EG25 (manufactured by The Nippon Synthetic Chemical Industry Co., Ltd.), PVA203 (Manufactured by Kuraray Co., Ltd.), PVA204 (Manufactured by Kuraray Co., Ltd.), PVA205 (Manufactured by Kuraray Co., Ltd.), JP-04 (manufactured by Japan VAM & POVAL Co., Ltd.) and JP-05 (manufactured by Japan VAM & POVAL Co., Ltd.).

The modified polyvinyl alcohols are obtained by subjecting the above-mentioned unmodified polyvinyl alcohols to one or two or more optional modification treatments. Examples include amine-modified polyvinyl alcohols, ethylene-modified polyvinyl alcohols, carboxylic acid-modified polyvinyl alcohols, diacetone-modified polyvinyl alcohols, thiol-modified polyvinyl alcohols and acetal-modified polyvinyl alcohols. Furthermore, modified polyvinyl alcohols such as polyvinyl alcohols whose terminals have been cation-modified, anion-modified polyvinyl alcohols each having an anionic group and non ion-modified polyvinyl alcohols may also be used. Among these, acetal-modified polyvinyl alcohols are preferable.

Examples of the acetal-modified polyvinyl alcohols include polyvinyl formal, polyvinyl ethanal, polyvinyl propanal, polyvinyl butyral (polyvinyl butanal), polyvinyl valeral, polyvinyl hexal, polyvinyl heptanal, polyvinyl 2-ethylhexal, polyvinyl cyclohexal, polyvinyl glutal, polyvinyl benzal, polyvinyl 2-methylbenzal, polyvinyl 3-methylbenzal, polyvinyl 4-methylbenzal, polyvinyl p-hydroxybenzal, polyvinyl-m-hydroxybenzal, polyvinyl phenyl acetal and polyvinyl-β-phenylpropanal. Among these, polyvinyl alcohols acetalized with a C1-C5 aldehyde (formaldehyde, acetaldehyde, propionaldehyde, butylaldehyde, valeraldehyde or the like), i.e., polyvinyl formal, polyvinyl ethanal, polyvinyl propanal, polyvinyl butyral and polyvinyl valeral are preferably used, and polyvinyl alcohols acetalized with a C2-C4 aldehyde, i.e., polyvinyl formal, polyvinyl ethanal, polyvinyl propanal and polyvinyl butyral are more preferably used.

The acetalization degree of the acetal-modified polyvinyl alcohol is preferably from 40 to 85 mol %, more preferably from 55 to 80 mol %, and further preferably from 60 to 75 mol %. The acetalization degree can be measured by infrared absorption spectroscopy (IR) using a FT-IR (FREEEX-ACT-II, FT-720, manufactured by Horiba Corporation). Furthermore, the amount of the hydroxyl groups is preferably from 15 to 35 mol % in view of tackiness, flexibility and the like.

The mass average molecular weight of the acetal-modified polyvinyl acetal is preferably from 90,000 to 400,000, more preferably from 90,000 to 370,000, and further preferably from 90,000 to 340,000. In this specification, the mass average molecular weight means a molecular weight represented in terms of polystyrene by detection by a differential refractometer by a gel permeation chromatography (GPC) analyzer (solvent: tetrahydrofuran (THF)) using a column of TSK gel GMHxL, TSK gel G4000HxL or TSK gel G2000HxL (manufactured by Tosoh Corporation).

The acetal-modified polyvinyl alcohol can be obtained by acetalizing an unmodified polyvinyl alcohol with a C1-C10 aldehyde. The above-mentioned C1-C10 aldehyde is not especially limited, and examples include formaldehyde, acetaldehyde, propionaldehyde, butylaldehyde, amylaldehyde, hexylaldehyde, heptylaldehyde, 2-ethylhexylaldehyde, cyclohexylaldehyde, furfural, glyoxal, glutalaldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde and β-phenylpropionaldehyde. Among these, C1-C5 aldehydes such as formaldehyde, acetaldehyde, propionaldehyde, butylaldehyde and amylaldehyde are preferable, and C2-C4 aldehydes such as acetaldehyde, propionaldehyde and butylaldehyde are more preferable. These aldehydes may be used singly, or by mixing two or more kinds.

As these modified polyvinyl alcohols, commercially available products may be used, or those produced by methods known in the art may also be used. For example, as the commercially available acetal-modified polyvinyl alcohols, Denka Butyral 3000-1, 5000-A, 6000-C and 6000-CS (manufactured by Denki Kagaku Kogyo Kabushiki Kaisha), S-LEC BX-1, BX-5 and KS-5 (manufactured by Sekisui Chemical Co., Ltd.) and the like can be used.

The above-mentioned polyvinyl pyrrolidone is a polymer of N-vinyl-2-pyrrolidone. The above-mentioned polyvinyl pyrrolidone has a viscosity average molecular weight of preferably from 5,000 to 800,000, more preferably from 10,000 to 630,000, and further preferably from 15,000 to 340,000.

The above-mentioned polyethylene oxide is a polymer of ethylene oxide. The polyethylene oxide has a mass average molecular weight of preferably from 1,000 to 800,000, more preferably from 5,000 to 630,000, and further preferably from 10,000 to 340,000.

Examples of the above-mentioned cellulose-based resin include internally-plasticized cellulose resins and externally-plasticized cellulose resins, and internally-plasticized cellulose resins are preferably used.

Examples of the internally-plasticized cellulose resins include cellulose esters, cellulose carbamates and cellulose ethers.

The cellulose esters include organic acid esters and inorganic acid esters. The cellulose esters may be mixed acid esters of the above-mentioned organic acids and inorganic acids.

The organic acid esters include cellulose alkylcarboxylic acid esters and cellulose aromatic carboxylic acid esters. The above-mentioned cellulose alkyl carboxylic acid esters include cellulose C2-C6 alkyl esters such as cellulose acetate, cellulose propionate, cellulose butyrate; cellulose pentanoate, cellulose hexanoate, cellulose acetate propionate, cellulose acetate butyrate, cellulose acetate pentanoate and cellulose acetate hexanoate; C1-C6 alkylcellulose C2-C6 alkyl esters such as methylcellulose acetate and ethylcellulose acetate; and C1-C6 haloalkylcellulose C1-C6 alkyl esters such as dichloromethylcellulose acetate, trichloromethylcellulose propionate and trifluoromethylcellulose acetate. Furthermore, examples of the above-mentioned cellulose aromatic carboxylic acid esters include cellulose C7-C12 aromatic esters such as cellulose phthalate, cellulose benzoate and cellulose-4-methylbenzoate. On the other hand, the inorganic acid esters include cellulose phosphate and cellulose sulfate. Among these, cellulose C2-C6 alkyl esters are preferable, and acetyl C3-C6 acyl celluloses such as cellulose acetate propionate, cellulose acetate butyrate, cellulose acetate pentanoate and cellulose acetate hexanoate are more preferable in view of transparency.

Examples of the cellulose carbamates include cellulose C1-C6 alkyl carbamates such as cellulose ethyl carbamate; cellulose C6-C12 aryl carbamates such as cellulose phenylcarbamate; C1-C6 alkylcellulose C1-C6 alkylcarbamates such as ethylcellulose propyl carbamate (cellulose ether carbamates); and C1-C6 alkyl cellulose C6-C12 aryl carbamates such as ethylcellulose phenyl carbamate (cellulose ether carbamate). Among these, C1-C6 alkyl cellulose C6-C12 aryl carbamates (cellulose ether carbamate) such as ethyl cellulose phenyl carbamate are preferably used.

Examples of the cellulose ethers include C1-C10 alkyl celluloses such as methyl cellulose, ethyl cellulose, propyl cellulose and pentyl cellulose; cyano C1-C10 alkyl celluloses such as cyanoethyl cellulose and cyanopropyl cellulose; and C6-C12 aryl-C1-C4 alkyl celluloses (aralkyl celluloses) such as benzyl cellulose. Among these, cyano C1-C10 alkyl alcohols such as cyanoethyl cellulose and cyanopropyl cellulose are preferable.

Among the above-mentioned cellulose-based resins, the cellulose esters and cellulose ethers are preferably used, and the cellulose esters are more preferably used.

The average polymerization degree of the cellulose-based resin is not especially limited, and is preferably from 50 to 8,000, more preferably from 100 to 7,000, and further preferably from 200 to 6,000. Furthermore, the average substitution degree of the cellulose-based resin is preferably from 1 to 3, more preferably from 1.3 to 3, further preferably from 1.5 to 3, and especially preferably 2 to 3. The ratio of the acetyl group to the C3-C6 acyl group in the acetyl C3-C6 acyl cellulose is such that the acetyl/C3-C6 acyl (molar ratio)=preferably from 90/10 to 5/95, more preferably from 70/30 to 10/90, and further preferably from 50/50 to 15/85.

As the cellulose-based resin, either a cellulose-based resin synthesized by a known method or a commercially available cellulose-based resin may be used. Examples of the method for synthesizing the cellulose-based resin include (a) a method of internally-plasticizing cellulose by reacting with a carboxylic acid, an alcohol, an isocyanate or the like, (b) a method of externally-plasticizing cellulose by adding a plastizer to the cellulose, and (c) a method of combination of the above-mentioned (a) and the above-mentioned (b).

Examples of the above-mentioned gelatins include various gelatins that have been widely used in the field of photosensitive materials for silver halide photography. More specifically, examples include acid-treated gelatins, alkali-treated gelatins, enzyme-treated gelatins, and derivatives thereof. General methods for producing gelatins are well-known, and for example, the descriptions of T. H. James: The Theory of Photographic Process $4^{th}$. ed. 1977 (Macmillan) page 55, Picture Handbook of Science (first volume), pages 72 to 75 (Maruzen), Basis for Photographic Engineering—Silver Halide Photography, pages 119 to 124 (Corona Publishing Co., Ltd.) and the like can be referred to. Furthermore, the gelatins described on page IX of Research Disclosure, Vol. 176, No. 17643 (December 1978) can also be exemplified.

The above-mentioned thickening polysaccharides are not especially limited, and examples include generally-known natural simple polysaccharides, natural composite polysaccharides, synthetic simple polysaccharides and synthetic composite polysaccharides. Specific examples include pectin, galactans (for example, agarose, agaropectin and the like), galactomannoglycan (for example, locust bean gum, guaran and the like), xyloglucan (for example, tamarind gum, tamarind seed gum and the like), glucomannoglycan (for example, konjak mannan, glucomannans derived from wood materials, xanthane gum and the like), galactoglucomannoglycans (for example, glycans derived from softwoods), arabinogalactoglycans (for example, glycan derived from soybean, glycans derived from microorganisms and the like), glucorhamnoglycans (for example, gellan gum and the like), glycosaminoglycans (for example, hyaluronic acid, keratan sulfate and the like), natural polymer polysaccharides derived from Rhodophyceae such as alginic acid and alginate salts, agar, κ-carrageenan, λ-carrageenan, ι-carrageenan and furcellaran, and celluloses such as carboxymethyl cellulose, hydroxyethyl cellulose and methyl cellulose.

Among the above-mentioned resins, the modified polyvinyl alcohol (especially, acetal-modified polyvinyl alcohols) and cellulose resins are preferably used.

The above-mentioned resins may be used singly, or by mixing two or more kinds.

The above-mentioned application liquid may further contain metal oxide particles together with the above-mentioned resins.

The metal oxide particles that can be used are not especially limited, and examples include dielectricmaterials that can be used in dry film formation processes and the like. Among these, titanium oxide ($TiO_2$) and silicon oxide ($SiO_2$) are preferably used.

As the above-mentioned titanium oxide ($TiO_2$) rutile-type titanium oxide, which especially has a high refractive index and a low catalyst activity, is preferably used. If the catalyst active is low, side reactions (photocatalyst reactions) that arise in the refractive index layers and the adjacent layers are suppressed, and thus the weather resistance can be high.

Furthermore, as the above-mentioned titanium oxide, titanium oxide obtained by hydrophobizing the surface of an aqueous titanium oxide sol having a pH of 1.0 to 3.0 and a positive zeta potential of the titanium particles to put the sol into a state in which the titanium oxide sol is dispersible in an organic solvent is preferably used. As the method for preparing the above-mentioned aqueous titanium oxide sol, for example, the matters described in JP-A Nos. S63-17221, H7-819, H9-165218, H11-43327, S63-17221, H7-819, H9-165218 and H11-43327 can be referred to.

For other methods for producing titanium oxide particles, for example, the method described in "Titanium Oxide— Physical Properties and Applied Technologies" (Manabu Kiyono, pages 255 to 258 (2000), Gihodo Shuppan Co., Ltd.), or the method of step (2) described in paragraphs [0011] to [0023] of WO 2007/039953 can be referred to. The production method by the above-mentioned step (2) is such that a titanium dioxide dispersion obtained in step (1) including treating titanium dioxide hydrate with at least one kind of a basic compound selected from the group consisting of hydroxides of alkali metals and hydroxides of alkaline earth metals, is treated with a carboxylic acid group-containing compound and an inorganic acid. In the present invention, an aqueous sol of titanium oxide whose pH has been adjusted to from 1.0 to 3.0 with an inorganic acid in step (2) can be used.

Examples of the above-mentioned silicon oxide ($SiO_2$) include synthetic amorphous silica and colloidal silica. Among these, an acidic colloidal silica sol is more preferably used, and a colloidal silica sol dispersed in water and/or an organic solvent is further preferably used. The above-mentioned colloidal silica can be obtained by thermal aging of a silica sol obtained by double decomposition of sodium silicate with an acid or the like, or by passing sodium silicate through an ion-exchange resin layer. Such colloidal silica is described in, for example, JP-A Nos. S57-14091, S60-219083, S60-219084, S61-20792, S61-188183, S63-17807, H4-93284, H5-278324, H6-92011, H6-183134, H6-297830, H7-81214, H7-101142, H7-179029 and H7-137431, and WO94/26530, and the like. Furthermore, as the colloidal silica, a synthetic product may be used, or a commercially available product may be used.

The above-mentioned metal oxide particles may be used singly, or by mixing two or more kinds.

The average particle size of the metal oxide particles is preferably from 2 to 100 nm, more preferably from 3 to 50 nm, and further preferably from 4 to 30 nm, The average particle size of the metal oxide particles is obtained by observing the particles themselves or the particles that have appeared on the cross-sectional surface or surface of the refractive index layer under an electron microscope, measuring the particle sizes of the 1,000 optional particles, and obtaining the simple average value thereof (number average). The particle size of the individual particle as used herein is represented by a diameter when a circle that is equal to the projected surface area thereof is supposed.

The content of the metal oxide particles is preferably 30 to 90% by mass, and more preferably 40 to 80% by mass, with respect to the total mass of the formed refractive index layers. If the content of the metal oxide particles is 30% by mass or more, it is preferable since a desired refractive index can be obtained. If the content of the metal oxide particles is 90% by mass or less, it is preferable since the flexibility of the film can be obtained, and the film can be easily formed.

In the case when the metal oxide particles are contained in both the high-refractive index layers and low-refractive index layers, the metal oxide particles have the same ionicity (electrical charge) by conducting an anionization treatment or a cationization treatment. By conducting the anionization treatment or cationization treatment, a repulsive force arises between the two kinds of metal oxide particles, and by this way, for example, flocculation and the like at the layer interfaces become difficult to arise during the multilayer application of the low-refractive index layers and high-refractive index layers.

As the anionization treatment of the metal oxide particles, for example, when an anion treatment of titanium oxide is exemplified, the titanium oxide particles can be anionized by coating with a silicon-containing hydrate. The amount of coating of the silicon-containing hydrate is generally from 3 to 30% by mass, preferably from 3 to 10% by mass, and more preferably from 3 to 8% by mass. If the coating amount is 30% by mass or less, it is preferable since desired refractive indices of the high-refractive index layers can be obtained, and if the coating amount is 3% or more it is preferable since the particles can be formed stably.

The cationization treatment of the metal oxide particles can be conducted, for example, by using a cationic compound. Examples of the above-mentioned cationic compound include cationic polymers, polyvalent metal salts and the like, and the polyvalent metal salts are preferable in view of adsorption force and transparency. Examples of the polyvalent metal salts include hydrochlorides, sulfates, nitrates, acetates, formates, succinates, malonates and chloroacetates of metals such as aluminum, calcium, magnesium, zinc, iron, strontium, barium, nickel, copper, scandium, gallium, indium, titanium, zirconium, tin and lead. Among these, water-soluble aluminum compounds, water-soluble calcium compounds, water-soluble magnesium compounds, water-soluble zinc compounds, water-soluble zirconium compounds are preferably used, and water-soluble aluminum compounds and water-soluble zirconium compounds are more preferably used. Specific examples of the above-mentioned water-soluble aluminum compounds include polyaluminum chloride (basic aluminum chloride), aluminum sulfate, basic aluminum sulfate, aluminum potassium sulfate (alum), ammonium aluminum sulfate (ammonium alum), sodium aluminum sulfate, aluminum nitrate, aluminum phosphate, aluminum carbonate, polyaluminum sulfate silicate, aluminum acetate and basic aluminum lactate. As used herein, the water-soluble in the water-soluble polyvalent metal compound means that the compound dissolves in 20° C. water by 1% by mass or more, and more preferably by 3% by mass or more. The coating amount of the cationic compound differs depending on the shape, particle size and the like of the metal oxide particles, and is preferably from 1% by mass to 15% by mass with respect to the metal oxide particles.

In the wet film formation process, examples of the preferable combinations of the materials for the high-refractive index layers-low-refractive index layers include polyvinyl alcohol and titanium oxide-polyvinyl alcohol and silicon oxide-polyvinyl alcohol, and zirconium oxide-gelatin and silicon oxide-polyvinyl alcohol.

The above-mentioned refractive index layer may further contain known additives. Examples of the additives include hardeners, amino acids and emulsion resins.

Curing Agent

In the case when the refractive index layer contains a resin, the above-mentioned hardeners have a function to cure the resin. Water resistance can be imparted to the refractive index layers by the curing.

The hardeners that can be used are not especially limited as long as they are hardeners that cause a curing reaction with a resin, and when the resin is an unmodified polyvinyl alcohol or a modified polyvinyl alcohol, it is preferable to use boric acids and salts thereof (oxygen acids having a boron atom as a center atom and salts thereof), specifically, orthoboric acid, diboric acid, metaboric acid, tetraboric acid, pentaboric acid and octaboric acid, or salts thereof. The boric acids and salts thereof may be used as a single aqueous solution, or by mixing two or more kinds, and it is especially preferable to use a mixed aqueous solution of a boric acid and sodium borate. Other known compounds can also be used, and the compounds are generally compounds having a group that can be reacted with the resin, or compounds that promote the reaction of the different groups possessed by the resin, and are suitably selected and used depending on the kind of the resin. Specific examples of the hardeners include epoxy-based hardeners such as diglycidyl ethyl ether, ethylene glycol diglycidyl ether, 1,4-butanediol diglycidyl ether, 1,6-diglycidylcyclohexane, N,N-diglycidyl-4-glycidyloxyaniline, sorbitol polyglycidyl ether and glycerol polyglycidyl ether; aldehyde-based hardeners such as formaldehyde and glyoxal; active halogen-based hardeners such as 2,4-dichloro-4-hydroxy-1,3,5-S-triazine; active vinyl-based compounds such as 1,3,5-tris-acryloyl-hexahydro-S-triazine and bisvinylsulfonylmethyl ether; and aluminum alum.

Furthermore, in the case when gelatin is used as the resin, it is preferable to use, as the hardener, for example, organic film hardeners such as vinylsulfone compounds, urea-formalin condensates, melamine-formalin condensates, epoxy-based compounds, aziridine-based compounds, active olefins and isocyanate-based compounds, and inorganic polyvalent metal salts of chromium, aluminum, zirconium and the like.

The total use amount of the hardener is preferably 1 to 600 mg per 1 g of the resin.

Emulsion Resin

The emulsion resins are generally resins formed by melt-adhesion of a polymer dispersed in an application liquid during film formation. Emulsions, which are raw materials for the emulsion resins, are obtained by emulsion polymerization of an oil-soluble monomer by using a polymer dispersing agent or the like.

The oil-soluble monomer that can be used is not especially limited, and examples include ethylene, propylene, butadiene, vinyl acetate and partial hydrolysates thereof, vinyl ethers, acrylic acids and esters thereof, methacrylic acid and esters thereof, acrylamide and derivatives thereof, methacrylamide and derivatives thereof, styrene, divinylbenzene, vinyl chloride, vinylidene chloride, maleic acid and vinylpyrrolidone. Among these, acrylic acid and esters thereof, and vinyl acetates are preferably used in view of transparency and particle size.

As the acrylic acid and/or esters thereof, and vinyl acetate-based emulsions, commercially available products may also be used, and examples include Acrit UW-309, UW-319SX and UW-520 (manufactured by Taisei Fine Chemical Co., Ltd.) and Mowinyl (manufactured by The Nippon Synthetic Chemical Industry Co., Ltd.).

Furthermore, the dispersing agents that can be used are not especially limited, and include low-molecular weight dispersing agents such as alkylsulfonic acid salts, alkylbenzenesulfonic acid salts, diethylamine, ethylenediamine and quaternary ammonium salts, and polymer dispersing agents such as polyoxyethylene nonyl phenyl ether, polyoxyethylene lauryl acid ether, hydroxyethyl cellulose and polyvinyl pyrrolidone, The above-mentioned emulsion has a glass transition temperature (Tg) of preferably 20° C. or less, and more preferably from −30 to 10° C., from the viewpoint of improvement of flexibility.

Other Additives

Other additives that can be applied to the refractive index layers in the present invention will be listed below. Examples include known respective additives such as the ultraviolet absorbers described in JP-A Nos. S57-74193, S57-87988 and S62-261476, and anionic, cationic or non-ionic respective surfactants, pH adjusting agents such as sulfuric acid, phosphoric acid, acetic acid, citric acid, sodium hydroxide, potassium hydroxide and potassium carbonate, defoaming agents, lubricants such as diethylene glycol, antiseptic agents, antimold agents, antistatic agents, matting agents, antioxidants, flame retarders, infrared ray absorbing agents, colorants and pigments.

Meanwhile, there are some cases in which the dielectric multilayer film contains both the component of the low-refractive index layer and the component of the high-refractive index layer, and consequently contains apart whose interface is not clear. In such cases, the component of the high-refractive index layer included between said layers, for example, metal oxide particles, is judged as a criterion. Specifically, for an EDX profile of the metal oxide particles in the high-refractive index layer in the thickness direction, the position where the count number of the metal oxide particles in the high-refractive index layer with respect to the peak top is ½ is set as an interface between the two layers.

Whether a high-refractive index layer or a low-refractive index layer is judged by comparing the refractive index with the adjacent refractive index layer, as mentioned above, and the refractive index of the high-refractive-index layer (nH) is preferably from 1.60 to 2.50, more preferably from 1.70 to 2.50, further preferably from 1.80 to 2.20, and especially preferably from 1.90 to 2.20. On the other hand, the refractive index of the low-refractive index layer (nL) is preferably from 1.10 to 1.60, more preferably from 1.30 to 1.55, and further preferably from 1.30 to 1.50. At this time, the values measured as above are adopted as the values of the refractive indices of the respective refractive index layers. Specifically, a refractive index layer to be measured is applied onto a support to give a coating, and the obtained coating is then cut into 10 cm×10 cm to thereby prepare a sample. In order to prevent the reflection of light on the rear surface, the surface opposite to the measurement surface (rear surface) of the sample is subjected to a roughening treatment, and a light absorption treatment is conducted by using a black spray. The reflectance in the visible ray region (400 nm to 700 nm) of the thus-prepared sample is measured on 25 points under a condition of 5° regular reflection by using a Type U-4000 (manufactured by Hitachi Corporation) as a spectrometer, an average value is obtained, and an average refractive index is obtained from the measurement result.

It is preferable that the near-infrared reflective film of the present embodiment is such that the ratio of the refractive index nH of any of the high-refractive index layer to the refractive index nL of at least one of the low-refractive index layer adjacent to said high-refractive index layer, which constitute the dielectric multilayer film, satisfies:

$$2 > nH/nL \geq 1.1.$$ [Mathematical Formula 10]

Since the ratio of the above-mentioned refractive indices (nH/nL) is within the above-mentioned range, the reflectance of light at a desired wavelength can be increased with a small number of layers. On the other hand, reflection peaks such as ripples arise in the visible region in some cases, but according to the near-infrared reflective film of the present embodiment, such reflection peaks in the visible region can be suppressed.

The difference between the refractive indices of the above-mentioned high-refractive index layer and the low-refractive index layer is preferably 0.05 or more, more preferably 0.06 or more, further preferably 0.1 or more, especially preferably 0.3 or more, and most preferably 0.4 or more. At this time, it is preferable that all of the ratios of the refractive indices and the differences in refractive indices among the refractive index layers that constitute the dielectric multilayer film are in the above-mentioned preferable ranges. However, even in this case, the uppermost layer and lowermost layer of the refractive index layers that constitute the reflective layer may have constitutions out of the above-mentioned preferable ranges.

The thickness of the refractive index layer is not especially limited, and is preferably from 20 to 800 nm, and more preferably from 50 to 350 nm. At this time, the refractive index layer that is closest to the side of the support of the dielectric multilayer film may be out of the above-mentioned range, and is preferably thicker than the other refractive index layers that constitute the dielectric multilayer film. The above-mentioned lowermost layer has a thickness of preferably from 1.2 to 8 times, and more preferably from 2 to 6 times of the average thickness of the other refractive index layers that constitute the dielectric multilayer film.

The range of the total layer number of the index layers is preferably 100 layers or less, more preferably 40 layers or less, and further preferably 20 layers or less.

In the near-infrared reflective film of the present embodiment, any of the high-refractive index layers and the low-refractive index layer adjacent to said high-refractive index layer, which constitute the dielectric multilayer film, satisfy:

$$1.1 \geq (dH \times nH)/(dL \times nL) > 1 \text{ or}$$

$$1 > (dH \times nH)/(dL \times nL) \geq 0.9. \quad \text{[Mathematical Formula 11]}$$

At this time, dH represents the thickness of the high-refractive index layer, nH represents the refractive index of the high-refractive index layer, dL represents the thickness of the low-refractive index layer, nL represents the refractive index of the low-refractive index layer, dH×nH represents the optical film thickness of the high-refractive index layer, and dL×nL represents the optical film thickness of the low-refractive index layer.

The above-mentioned "any" means that all of the optical film thicknesses of the high-refractive index layers and the low-refractive index layers adjacent to said high-refractive index layers that constitute the dielectric multilayer film satisfy the above-mentioned range.

The near-infrared reflective film can be generally designed by suitably considering the optical film thickness so as to reflect light at a desired wavelength. For example, when a desired wavelength (wavelength of near-infrared ray) is supposed to be λ, the high-refractive index layer and low-refractive index layer can be respectively designed so as to satisfy $$nH \times dH = \lambda/4 \text{ and}$$

$$nL \times dL = \lambda/4. \quad \text{[Mathematical Formula 12]}$$

By designing by this way, the reflection lights of near-infrared ray are enhanced by each other by interference, and thus a near-infrared reflective film having a high reflectance in the near-infrared region can be obtained. However, the reflection lights of visible ray (side reflection) are also enhanced by each other by interference together with the reflected lights of near-infrared ray (major reflection), and thus reflection peaks such as ripples in the visible region can also arise. This embodiment is designed so that the optical film thicknesses of the high-refractive index layer and the low-refractive index layer adjacent to said high-refractive index layer are different. By this way, the reflection peaks in the visible region can be suppressed. The reason therefor is that the reflection peaks by the reflected lights that are enhanced by each other by interference are reduced and thus the reflection peaks by the reflected lights of the relatively weak side reflection can be diminished by providing different optical film thicknesses.

[Dielectric Film Group Set]

The dielectric multilayer film that constitutes the near-infrared reflective film of the present embodiment has a dielectric film group set. The above-mentioned dielectric film group set includes a first dielectric film group and a second dielectric film group. At this time, the above-mentioned dielectric multilayer film may have a constitution that is formed by only a dielectric film group set, as shown in FIG. 1, or may include other refractive index layers.

(First Dielectric Film Group)

The first dielectric film group includes at least three high-refractive index layers (refractive index $n_1H$, thickness $d_1H$) and at least three low-refractive index layers (refractive index $n_1L$, thickness $d_1L$), respectively. Specifically, the above-mentioned first dielectric film group is formed by alternately layering three or more high-refractive index layers having the same refractive index and thickness and three or more low-refractive index layers having the same refractive index and thickness, respectively. Accordingly, the above-mentioned first dielectric film group includes at least six refractive index layers.

(Second Dielectric Film Group)

As in the first dielectric film group, the second dielectric film group also includes at least three high-refractive index layers (refractive index $n_2H$, thickness $d_2H$) and at least three low-refractive index layers (refractive index $n_2L$, thickness $d_2L$), respectively. Specifically, the above-mentioned second dielectric film group is formed by alternately layering three or more high-refractive index layers having the same refractive index and thickness and three or more low-refractive index layers having the same refractive index and thickness, respectively. Accordingly, as in the first dielectric film group, the above-mentioned second dielectric film group also includes at least six refractive index layers. The above-mentioned second dielectric film group is disposed in the state that it is in contact with the opposite side of the support of the first dielectric film group.

Meanwhile, the fact remains that the respective high-refractive index layers and low-refractive index layers that constitute the first dielectric film group and second dielectric film group are the high-refractive index layers and low-refractive index layers that constitute the dielectric multilayer film, and the high-refractive index layer and the low-refractive index layer adjacent to said high-refractive index layer satisfy:

$$1.1 \geq (dH \times nH)/(dL \times nL) > 1 \text{ or}$$

$$1 > (dH \times nH)/(dL \times nL) \geq 0.9. \quad \text{[Mathematical Formula 13]}$$

At this time, it is especially preferable that the optical film thickness of the high-refractive index layer ($d_1H \times n_1H$) and the optical film thickness of the low-refractive index layer adjacent to said high-refractive index layer ($d_1L \times n_1L$) in the first dielectric film group satisfy:

$$1.06 \geq (d_1H \times n_1H)/(d_1L \times n_1L) > 1 \text{ or}$$

$$1 > (d_1H \times n_1H)/(d_1L \times n_1L) \geq 0.94, \text{ and/or} \quad \text{[Mathematical Formula 14]}$$

the optical film thickness of the high-refractive index layer ($d_2H \times n_2H$) and the optical film thickness of the low-refractive index layer ($d_2L \times n_2L$) adjacent to said high-refractive index layer in the above-mentioned second dielectric film group satisfy:

$$1.06 \geq (d_2H \times n_2H)/(d_2L \times n_2L) > 1 \text{ or}$$

$$1 > (d_2H \times n_2H)/(d_2L \times n_2L) \geq 0.94, \text{ and} \quad \text{[Mathematical Formula 15]}$$

it is more preferable that the optical film thicknesses of the high-refractive index layers and the optical film thicknesses of the low-refractive index layers adjacent to said high-refractive index layers in the first dielectric film group and second dielectric film group both satisfy the above-mentioned formula.

Furthermore, in the near-infrared reflective film of the present embodiment, the above-mentioned dielectric film group set satisfies:

$$1.10 \geq d_2H/d_1H > 1 \text{ and}$$

$$1.10 \geq d_2L/d_1L > 1. \quad \text{[Mathematical Formula 16]}$$

Namely, the thicknesses of the high-refractive index layers and low-refractive index layers that constitute the second dielectric film group are thicker than the high-refractive index layers and low-refractive index layers that constitute the first dielectric film group.

Furthermore, in the near-infrared reflective film of the present embodiment, it is preferable that the above-mentioned dielectric film group set satisfies:

$$1.10 \geq (d_2H \times n_2H)/(d_1H \times n_1H) > 1.06, \text{ and/or} \quad \text{[Mathematical Formula 17]}$$

satisfies:

$$1.10 \geq (d_2L \times n_2L)/(d_1L \times n_1L) > 1.06, \quad \text{[Mathematical Formula 18]}$$

and it is more preferable that the above-mentioned dielectric film group set satisfies both of the above-mentioned formulas. Namely, in the relationship of the first dielectric film group and second dielectric film group, it is preferable that the optical film thicknesses of the high-refractive index layers that constitute the second dielectric film group are larger than the optical film thicknesses of the high-refractive index layers that constitute the first dielectric film group within a predetermined range, and/or the optical film thicknesses of the low-refractive index layers that constitute the second dielectric film group are larger than the optical film thicknesses of the low-refractive index layers that constitute the first dielectric film group within a predetermined range.

The above-mentioned dielectric multilayer film may have a plurality of dielectric film group sets. Namely, in an exemplary embodiment, the dielectric multilayer film that constitutes the near-infrared reflective film may have two or more dielectric multilayer film group sets.

Since the near-infrared reflective film has the above-mentioned constitution, reflection peaks such as ripples that can be generated in the visible region can be suppressed, and an excellent reflection peak in the near-infrared region can be shown, as compared to conventional infrared reflective films that aim at suppressing reflection peaks that can arise in the visible region, by simply providing only different optical film thicknesses.

[Method for Producing Near-Infrared Reflective Film]

The method for producing the near-infrared reflective can be divided into a dry film formation process and a wet film formation process depending on the method for forming the above-mentioned refractive index layers.

(Dry Film Formation Process)

In the dry film formation process, a near-infrared reflective film can be produced by, for example, by sequentially forming refractive index layers by depositing two or more dielectric materials on a support.

Examples of the above-mentioned deposition process include physical deposition processes and chemical deposition processes. Among these, the physical deposition processes are preferably used, and specifically, a vacuum deposition process or a sputtering process is more preferably used. The vacuum deposition process is a method in which a thin film is formed on a base material by thermal evaporation of a dielectric material by resistance heating or irradiation with an electron gun. The sputtering process is a method in which plasma is generated between a base material and a target by a plasma generation apparatus, and a dielectric material is irradiated with ion to allow collision of the ion by utilizing a potential gradient to knock out the dielectric material, whereby a film is formed on the base material. For these methods, known means can be suitably referred to (Wet Film Formation Process)

In the wet film formation process, a near-infrared reflective film can be produced by forming refractive index layers by, for example, a method in which refractive index layers are sequentially formed on a support by applying an application liquid and drying the application liquid, a method in which an application liquid is plurally applied and dried, or by combination of these methods.

The above-mentioned application liquid can contain a resin and/or metal oxide particles, and other additives, and generally a solvent. The above-mentioned solvent may be water, an organic solvent, or a mixed solvent thereof.

Examples of the above-mentioned organic solvent include alcohols such as methanol, ethanol, 2-propanol and 1-butanol, esters such as ethyl acetate, butyl acetate, propylene glycol monomethyl ether acetate and propylene glycol monoethyl ether acetate, ethers such as diethyl ether, propylene glycol monomethyl ether and ethylene glycol monoethyl ether, amides such as dimethylformamide and N-methylpyrrolidone, and ketones such as acetone, methyl ethyl ketone, acetylacetone and cyclohexanone. These organic solvents may be used singly or by mixing two or more kinds.

In view of environments, easiness of operation and the like, as the solvent for the application liquid, water, or a mixed solvent of water and methanol, ethanol or ethyl acetate is preferably used, and water is more preferably used.

The concentration of the resin in the application liquid is preferably from 1 to 10% by mass. Furthermore, in the case when the application liquid contains metal oxide particles, the concentration of the metal oxide particles is preferably from 1 to 50% by mass.

The method for preparing the application liquid is not especially limited, and includes a method in which a resin, and metal oxide particles and other additives that are added as necessary, are added and mixed by stirring. At this time, the order of addition of the respective components is also not especially limited, and the respective components may be sequentially added under stirring or may be added at once under stirring. Where necessary, the viscosity may be adjusted to be a suitable viscosity by further using a solvent.

As the system for applying the application liquid, for example, a roll coating process, a rod bar coating process, an air knife coating process, a spray coating process, a curtain application process, or the slide bead application processes using a hopper described in U.S. Pat. Nos. 2,761,419 and 2,761,791, an extrusion coat process and the like are preferably used.

In the case when the above-mentioned application system is simultaneous multi-layer application using a slide bead application system, the application liquid has a viscosity of preferably from 5 to 100 mPa·s, and more preferably from 10 to 50 mPa·s. Furthermore, in the case of simultaneous multi-layer application using a curtain application system, the application liquid has a viscosity of preferably from 5 to 1,200 mPa·s, and more preferably from 25 to 500 mPa·s.

The coatings obtained by applying the application liquid are dried at preferably 60 to 120° C., and preferably at 80 to 95° C., depending on the used resin, thereby refractive index layers can be formed.

[Near-Infrared Reflective Glass]

According to the present invention, a near-infrared reflective glass being formed by the above-mentioned near-infrared reflective film which is laminated to the surface of a glass plate is provided.

The above-mentioned glass plate is not especially limited, and known glasses can be used. Alternatively, a resin as an alternative for glass may also be used. The above-mentioned resin as an alternative for glass is not especially limited, and examples include polycarbonate resins, polysulfone resins, acrylic resins, polyolefin resins, polyether resins, polyester resins, polyamide resins, polysulfide resins, unsaturated polyester resins, epoxy resins, melamine resins, phenolic resins, diallylphthalate resins, polyimide resins, urethane resins, polyvinyl acetate resins, polyvinyl alcohol resins, styrene resins and vinyl chloride resins. The above-mentioned resins as alternatives for glass may be either thermoplastic resins, thermosetting resins and ionizing radiation-curable resins. The resins as alternatives for glass may be used singly, or by combining two or more kinds.

The above-mentioned glass plate can be produced by using a glass or a resin as an alternative for glass, by a known method such as extrusion molding, calendar molding, injection molding, hollow molding and compression molding. The thickness of the above-mentioned glass plate is not especially limited, and is generally from 0.1 mm to 5 cm.

The above-mentioned near-infrared reflective film is generally laminated to the surface of the glass plate through an adhesive layer. The adhesive that constitutes the above-mentioned adhesive layer is not especially limited, and is preferably an adhesive containing a photocurable resin or a thermosetting resin as a main component, more preferably an acrylic-based resin or a silicone-based resin, and further preferably an acrylic-based resin. The above-mentioned resin is preferably used as a solvent-based adhesive in view of control of peeling strength and the like. At this time, for example, in the case when a solution-polymerized polymer is used as the acrylic solvent-based adhesive, the monomer as a raw material is not especially limited, and known monomers can be used. In addition, the adhesive layer may suitably contain an ultraviolet absorber, an antioxidant, an antistatic agent, a thermal stabilizer, a lubricant, a filler, a colorant and an adhesion controlling agent.

Examples of the near-infrared reflective glass include an embodiment in which the near-infrared reflective film, adhesive layer and glass plate are laminated in this order, and an embodiment in which the glass plate, adhesive layer, near-infrared reflective film, adhesive layer and glass plate are laminated in this order (an embodiment of a laminated glass).

In the case of the embodiment in which the near-infrared reflective film, adhesive layer and glass plate are laminated in this order, it is preferable that the dielectric multilayer film is laminated to the surface of the glass plate through the adhesive layer, i.e., the lamination is conducted in the order of support-dielectric multilayer film-adhesive layer-glass plate.

Furthermore, in the case of the embodiment of the laminated glass, a polyvinyl butyral-based resin or an ethylene-vinyl acetate copolymer-based resin may be used as a medium layer. Specific examples include plastic polyvinyl butyrals (those manufactured by Sekisui Chemical Co., Ltd., manufactured by Mitsubishi Plastics, Inc. and the like), ethylene-vinyl acetate copolymers (Dumiran manufactured by Du Pont; manufactured by Takeda Pharmaceutical Company Ltd.) and modified ethylene-vinyl acetate copolymers (Melthene G; manufactured by Tosoh Corporation).

The adiabatic performance and solar shading heat shielding performance of the infrared reflective film or infrared reflective glass can be obtained by methods based on JIS R 3209: 1998 (multi-layered glass), JIS R 3106: 1998 (Methods for testing transmittance, reflectance, emissivity and solar heat gain coefficient of sheet glass) and JIS R 3107: 1998 (Method for calculating thermal resistance and heat transmission coefficient in architecture of sheet glass).

The solar transmittance, solar reflectance, emissivity and visible ray transmittance are measured as follows. (1) The spectral transmittance and spectral reflectance of each single sheet glass are measured by using a spectrometer at a wavelength of (300 to 2500 nm). Furthermore, the emissivity is measured by using a spectrometer at a wavelength of from 5.5 to 50 μm. As the emissivities of float sheet glass, polished sheet glass, figured glass and heat-ray absorbing sheet glass, predetermined values are used. (2) The solar transmittance, solar reflectance, solar absorbability and corrected emissivity are calculated by calculating the solar transmittance, solar reflectance, solar absorbability and vertical emissivity in accordance with JIS R 3106: 1998. The corrected emissivity is obtained by multiplying the coefficient shown in JIS R 3107: 1998 by the vertical emissivity. The adiabatic property and solar shading heat shielding property are obtained as follows. (1) Using the measured value of the thickness and the corrected emissivity, the heat resistance of the multi-layered glass is calculated in accordance with JIS R 3209: 1998. However, in the case when the hollow layer exceeds 2 mm, the gas-heat conductance of the hollow layer is obtained in accordance with JIS R 3107: 1998. (2) The adiabatic property is obtained as a heat transmission resistance by adding the heat transfer resistance to the heat resistance of the multi-layered glass. (3) The solar shading heat shielding property is calculated by obtaining the solar heat gain coefficient according to JIS R 3106:1998, and subtracting the solar heat gain coefficient from 1.

EXAMPLES

The present invention will be explained below in detail with reference to Examples, but the present invention is not limited at all by these Examples. In Examples, the indication "part(s)" or "%" is used, and unless otherwise indicated, this represents "part(s) by mass" or "% by mass".

Example 1

Magnesium fluoride (MgF) and titanium oxide ($TiO_2$) are alternately sputtered in this order on an Iupiron sheet NF-2000, which is a polycarbonate (manufactured by Mitsubishi Gas Chemical Company) by using a sputtering apparatus, whereby a near-infrared reflective film of 12 layers was produced. According to the relationship of the values of the refractive indices, the layers formed of magnesium fluoride are low-refractive index layers (refractive index: 1.33), and the layers formed of titanium oxide are high-refractive index layers (refractive index: 2.70). Furthermore, the lowermost layer support adjacent to the base material is a low-refractive index layer. The constitution of the obtained near-infrared reflective film is as mentioned below.

The first layer to the sixth layer are in a first dielectric film group.

The seventh layer to the twelfth layer are in a second dielectric film group.

The high-refractive index layers in the first dielectric film group each have a refractive index $(n_1H)=2.70$, a thickness $(d_1H)=102$ nm, and an optical film thickness $(n_1H \times d_1H)=275$.

The low-refractive index layers in the first dielectric film group each have a refractive index $(n_1L)=1.33$, a thickness $(d_1L)=197$ nm, and an optical film thickness $(n_1L \times d_1L)=262$.

The high-refractive index layers in the second dielectric film group each have a refractive index $(n_2H)=2.70$, a thickness $(d_2H)=109$ nm, and an optical film thickness $(n_2H \times d_2H)=294$.

The low-refractive index layers in the second dielectric film group each have a refractive index $(n_2L)=1.33$, a thickness $(d_2L)=211$ nm, and an optical film thickness $(n_2L \times d_2L)=281$.

Accordingly, the relationships of the optical film thicknesses and the like are as follows.

$(d_1H \times n_1H)/(d_1L \times n_1L)=1.05$ $(d_2H \times n_2H)/(d_2L \times n_2L)=1.05$ $d_2H/d_1H=1.07$ $d_2L/d_1L=1.07$ $(d_2H \times n_2H)/(d_1H \times n_1H)=1.07$ $(d_2L \times n_2L)/(d_1L \times n_1L)=1.07$ $nH/nL=2.03$.

Comparative Example 1

A near-infrared reflective film was produced in a similar method to that of Example 1, except that the thicknesses of the high-refractive index layers and low-refractive index layers were changed. The constitution of the obtained near-infrared reflective film is as follows.

The high-refractive index layers each have a refractive index (nH)=2.70, a thickness (dH)=90 nm, and an optical film thickness (nH×dH)=243.

The low-refractive index layers each have a refractive index (nL)=1.33, a thickness (dL)=182 nm, and an optical film thickness (nL×dL)=242.

Accordingly, the relationships of the optical film thicknesses and the like are as follows.

$(dH \times nH)/(dL \times nL)=1.00$ $nH/nL=2.03$.

Comparative Example 2

A near-infrared reflective film was produced in a similar method to that of Example 1, except that the thicknesses of the high-refractive index layers and low-refractive index layers were changed. The constitution of the obtained near-infrared reflective film is as follows.

The high-refractive index layers each have a refractive index (nH)=2.70, a thickness (dH)=82 nm, and an optical film thickness (nH×dH)=221.

The low-refractive index layers each have a refractive index (nL)=1.33, thickness (dL)=201 nm, and an optical film thickness (nL×dL)=267.

Accordingly, the relationships of the optical film thicknesses and the like are as follows.

$(dH \times nH)/(dL \times nL)=0.83$ $nH/nL=2.03$.

Comparative Example 3

A near-infrared reflective film was produced in a similar method to that of Example 1, except that the thicknesses of the high-refractive index layers and low-refractive index layers were changed. The constitution of the obtained near-infrared reflective film is as follows.

The first layer to the sixth layer are in a first dielectric film group.

The seventh layer to the twelfth layer are in a second dielectric film group.

The high-refractive index layers in the first dielectric film group each have a refractive index $(n_1H)=2.70$, thickness $(d_1H)=94$ nm, and an optical film thickness $(n_1H \times d_1H)=254$.

The low-refractive index layers in the first dielectric film group each have a refractive index $(n_1L)=1.33$, a thickness $(d_1L)=178$ nm, and an optical film thickness $(n_1L \times d_1L)=237$.

The high-refractive index layers in the second dielectric film group each have a refractive index $(n_2H)=2.70$, a thickness $(d_2H)=92$ nm, and an optical film thickness $(n_2H \times d_2H)=248$.

The low-refractive index layers in the second dielectric film group each have a refractive index $(n_2L)=1.33$, thickness $(d_2L)=173$ nm, and an optical film thickness $(n_2L \times d_2L)=230$.

Accordingly, the relationships of the optical film thicknesses and the like are as follows.

$(d_1H \times n_1H)/(d_1L \times n_1L)=1.07$ $(d_2H \times n_2H)/(d_2L \times n_2L)=1.08$ $d_2H/d_1H=0.98$ $d_2L/d_1L=0.97$ $(d_2H \times n_2H)/(d_1H \times n_1H)=0.98$ $(d_2L \times n_2L)/(d_1L \times n_1L)=0.97$ $nH/nL=2.03$.

Comparative Example 4

A near-infrared reflective film was produced in a similar method to that of Example 1, except that the thicknesses of the high-refractive index layers and low-refractive index layers were changed. The constitution of the obtained near-infrared reflective film is as follows.

The first layer to the sixth layer are in a first dielectric film group.

The seventh layer to the twelfth layer are in a second dielectric film group.

The high-refractive index layers in the first dielectric film group each have a refractive index $(n_1H)=2.70$, thickness $(d_1H)=90$ nm, and an optical film thickness $(n_1H \times d_1H)=243$.

The low-refractive index layers in the first dielectric film group each have a refractive index $(n_1L)=1.33$, a thickness $(d_1L)=197$ nm, and an optical film thickness $(n_1L \times d_1L)=262$.

The high-refractive index layers in the second dielectric film group each have a refractive index $(n_2H)=2.70$, a thickness $(d_2H)=88$ nm, and an optical film thickness $(n_2H \times d_2H)=238$.

The low-refractive index layers in the second dielectric film group each have a refractive index $(n_2L)=1.33$, a thickness $(d_2L)=192$ nm, and an optical film thickness $(n_2L \times d_2L)=255$.

Accordingly, the relationships of the optical film thicknesses and the like are as follows.

$$(d_1H \times n_1H)/(d_1L \times n_1L)=0.93$$

$$(d_2H \times n_2H)/(d_2L \times n_2L)=0.93$$

$$d_2H/d_1H=0.98$$

$$d_2L/d_1L=0.97$$

$$(d_2H \times n_2H)/(d_1H \times n_1H)=0.98$$

$$(d_2L \times n_2L)/(d_1L \times n_1L)=0.97$$

$$nH/nL=2.03.$$

Example 2

An alternately-layered body of 128 layers of polyethylene as a shell, a meltage of polyethylene terephthalate (PET) (inherent viscosity: 0.65) as a core and a meltage of polyethylene naphthalate (PEN) (inherent viscosity: 0.63) was injected onto a casting drum by using multilayer injection dies (in-house product). The injected layered film was then carried while the film was tightly attached to a cooling drum to thereby solidify the film by cooling, and thus a multilayer layered unstretched film was obtained. This unstretched film was heated to 110° C., stretched by 3.3 times in the longitudinal direction by rolls, and then stretched by 3.3 times in the transverse direction by clips in a tenter. The film was subjected to thermal fixing at 230° C. while the film was fixed with the clips, and rapidly cooled to room temperature, whereby a near-infrared reflective film of 128 layers having polyethylene shells on the both surfaces thereof was produced. According to the relationship of the values of the refractive indices, the layers formed of PET are low-refractive index layers (refractive index: 1.57), and the layers formed of PEN are high-refractive index layers (refractive index: 1.64). Furthermore, the lowermost layer adjacent to the base material is a low-refractive index layer. The constitution of the obtained near-infrared reflective film is as follows.

The first layer to the 32$^{nd}$ layer are in a first dielectric film group.

The 33$^{rd}$ layer to the 64$^{th}$ layer are in a second dielectric film group.

The 65$^{th}$ layer to the 96$^{th}$ layer are in a third dielectric film group.

The 97$^{th}$ layer to the 128$^{th}$ layer are in a fourth dielectric film group.

The high-refractive index layers in the first dielectric film group each have a refractive index $(n_1H)=1.64$, a thickness $(d_1H)=122$ nm, and an optical film thickness $(n_1H \times d_1H)=200$.

The low-refractive index layers in the first dielectric film group each have a refractive index $(n_1L)=1.57$, a thickness $(d_1L)=134$ nm, and an optical film thickness $(n_1L \times d_1L)=210$.

The high-refractive index layers in the second dielectric film group each have a refractive index $(n_2H)=1.64$, a thickness $(d_2H)=132$ nm, and an optical film thickness $(n_2H \times d_2H)=216$.

The low-refractive index layers in the second dielectric film group each have a refractive index $(n_2L)=1.57$, a thickness $(d_2L)=144$ nm, and an optical film thickness $(n_2L \times d_2L)=226$.

The high-refractive index layers in the third dielectric film group each have a refractive index $(n_3H)=1.64$, a thickness $(d_3H)=142$ nm, and an optical film thickness $(n_3H \times d_3H)=233$.

The low-refractive index layers in the third dielectric film group each have a refractive index $(n_3L)=1.57$, a thickness $(d_3L)=156$ nm, and an optical film thickness $(n_3L \times d_3L)=245$.

The high-refractive index layers in the fourth dielectric film group each have a refractive index $(n_4H)=1.64$, a thickness $(d_4H)=154$ nm, and an optical film thickness $(n_4H \times d_4H)=253$.

The low-refractive index layers in the fourth dielectric film group each have a refractive index $(n_4L)=1.57$, a thickness $(d_4L)=169$ nm, and an optical film thickness $(n_4L \times d_4L)=265$.

Accordingly, the relationships of the optical film thicknesses and the like are as follows.

$$(d_1H \times n_1H)/(d_1L \times n_1L)=0.95$$

$$(d_2H \times n_2H)/(d_2L \times n_2L)=0.96$$

$$d_2H/d_1H=1.08$$

$$d_2L/d_1L=1.07$$

$$(d_2H \times n_2H)/(d_1H \times n_1H)=1.08$$

$$(d_2L \times n_2L)/(d_1L \times n_1L)=1.08$$

$$(d_3H \times n_3H)/(d_3L \times n_3L)=0.95$$

$$(d_4H \times n_4H)/(d_4L \times n_4L)=0.95$$

$$d_4H/d_3H=1.08$$

$$d_4L/d_3L=1.08$$

$$(d_4H \times n_4H)/(d_3H \times n_3H)=1.09$$

$$(d_4L \times n_4L)/(d_3L \times n_3L)=1.08$$

$$nH/nL=1.04.$$

Example 3

A near-infrared reflective film was produced in a similar method to that of Example 2, except that the thicknesses of the high-refractive index layers and low-refractive index layers were changed. The constitution of the obtained near-infrared reflective film is as follows.

The first layer to the $32^{nd}$ layer are in a first dielectric film group.

The $33^{rd}$ layer to the $64^{th}$ layer are in a second dielectric film group.

The $65^{th}$ layer to the $96^{th}$ layer are in a third dielectric film group.

The $97^{th}$ layer to the $128^{th}$ layer are in a fourth dielectric film group.

The high-refractive index layers in the first dielectric film group each have a refractive index $(n_1H)=1.64$, a thickness $(d_1H)=122$ nm, and an optical film thickness $(n_1H \times d_1H)=200$.

The low-refractive index layers in the first dielectric film group each have a refractive index $(n_1L)=1.57$, a thickness $(d_1L)=134$ nm, and an optical film thickness $(n_1L \times d_1L)=210$.

The high-refractive index layers in the second dielectric film group each have a refractive index $(n_2H)=1.64$, a thickness $(d_2H)=126$ nm, and an optical film thickness $(n_2H \times d_2H)=207$.

The low-refractive index layers in the second dielectric film group each have a refractive index $(n_2L)=1.57$, a thickness $(d_2L)=138$ nm, and an optical film thickness $(n_2L \times d_2L)=217$.

The high-refractive index layers in the third dielectric film group each have a refractive index $(n_3H)=1.64$, a thickness $(d_3H)=129$ nm, and an optical film thickness $(n_3H \times d_3H)=212$.

The low-refractive index layers in the third dielectric film group each have a refractive index $(n_3L)=1.57$, a thickness $(d_3L)=142$ nm, and an optical film thickness $(n_3L \times d_3L)=223$.

The high-refractive index layers in the fourth dielectric film group each have a refractive index $(n_4H)=1.64$, a thickness $(d_4H)=133$ nm, and an optical film thickness $(n_4H \times d_4H)=218$.

The low-refractive index layers in the fourth dielectric film group each have a refractive index $(n_4L)=1.57$, a thickness $(d_4L)=146$ nm, and an optical film thickness $(n_4L \times d_4L)=229$.

Accordingly, the relationships of the optical film thicknesses and the like are as follows.

$(d_1H \times n_1H)/(d_1L \times n_1L)=0.95$ $(d_2H \times n_2H)/(d_2L \times n_2L)=0.95$ $d_2H/d_1H=1.03$ $d_2L/d_1L=1.03$ $(d_2H \times n_2H)/(d_1H \times n_1H)=1.04$ $(d_2L \times n_2L)/(d_1L \times n_1L)=1.03$ $(d_3H \times n_3H)/(d_3L \times n_3L)=0.95$ $(d_4H \times n_4H)/(d_4L \times n_4L)=0.95$ $d_4H/d_3H=1.03$ $d_4L/d_3L=1.03$ $(d_4H \times n_4H)/(d_3H \times n_3H)=1.03$ $(d_4L \times n_4L)/(d_3L \times n_3L)=1.03$ $nH/nL=1.04.$ Example 4

A near-infrared reflective film was produced in a similar method to that of Example 2, except that the thicknesses of the high-refractive index layers and low-refractive index layers were changed. The constitution of the obtained near-infrared reflective film is as follows.

The first layer to the $32^{nd}$ layer are in a first dielectric film group.

The $33^{rd}$ layer to the $64^{th}$ layer are in a second dielectric film group.

The $65^{th}$ layer to the $96^{th}$ layer are in a third dielectric film group.

The $97^{th}$ layer to the $128^{th}$ layer are in a fourth dielectric film group.

The high-refractive index layers in the first dielectric film group each have a refractive index $(n_1H)=1.64$, a thickness $(d_1H)=119$ nm, and an optical film thickness $(n_1H \times d_1H)=195$.

The low-refractive index layers in the first dielectric film group each have a refractive index $(n_1L)=1.57$, a thickness $(d_1L)=134$ nm, and an optical film thickness $(n_1L \times d_1L)=210$.

The high-refractive index layers in the second dielectric film group each have a refractive index $(n_2H)=1.64$, a thickness $(d_2H)=122$ nm, and an optical film thickness $(n_2H \times d_2H)=200$.

The low-refractive index layers in the second dielectric film group each have a refractive index $(n_2L)=1.57$, a thickness $(d_2L)=138$ nm, and an optical film thickness $(n_2L \times d_2L)=217$.

The high-refractive index layers in the third dielectric film group each have a refractive index $(n_3H)=1.64$, a thickness $(d_3H)=126$ nm, and an optical film thickness $(n_3H \times d_3H)=207$.

The low-refractive index layers in the third dielectric film group each have refractive index $(n_3L)=1.57$, a thickness $(d_3L)=142$ nm, and an optical film thickness $(n_3L \times d_3L)=223$.

The high-refractive index layers in the fourth dielectric film group each have a refractive index $(n_4H)=1.64$, a thickness $(d_4H)=130$ nm, and an optical film thickness $(n_4H \times d_4H)=213$.

The low-refractive index layers in the fourth dielectric film group each have a refractive index $(n_4L)=1.57$, a thickness $(d_4L)=147$ nm, and an optical film thickness $(n_4L \times d_4L)=231$.

Accordingly, the relationships of the optical film thicknesses and the like are as follows.

$(d_1H \times n_1H)/(d_1L \times n_1L)=0.93$ $(d_2H \times n_2H)/(d_2L \times n_2L)=0.92$ $d_2H/d_1H=1.03$ $d_2L/d_1L=1.03$ $(d_2H \times n_2H)/(d_1H \times n_1H)=1.03$ $(d_2L \times n_2L)/(d_1L \times n_1L)=1.03$ $(d_3H \times n_3H)/(d_3L \times n_3L)=0.93$ $(d_4H \times n_4H)/(d_4L \times n_4L)=0.92$ $d_4H/d_3H=1.03$ $d_4L/d_3L=1.04$ $(d_4H \times n_4H)/(d_3H \times n_3H)=1.03$ $(d_4L \times n_4L)/(d_3L \times n_3L)=1.04$ $nH/nL=1.04.$

Example 5

A near-infrared reflective film was produced in a similar method to that of Example 2, except that the thicknesses of the high-refractive index layers and low-refractive index layers were changed. The constitution of the obtained near-infrared reflective film is as follows.

The first layer to the $32^{nd}$ layer are in a first dielectric film group.

The $33^{rd}$ layer to the $64^{th}$ layer are in a second dielectric film group.

The $65^{th}$ layer to the $96^{th}$ layer are in a third dielectric film group.

The $97^{th}$ layer to the $128^{th}$ layer are in a fourth dielectric film group.

The high-refractive index layers in the first dielectric film group each have a refractive index $(n_1H)=1.64$, a thickness $(d_1H)=127$ nm, and an optical film thickness $(n_1H \times d_1H)=208$.

The low-refractive index layers in the first dielectric film group each have a refractive index $(n_1L)=1.57$, a thickness $(d_1L)=123$ nm, and an optical film thickness $(n_1L \times d_1L)=193$.

The high-refractive index layers in the second dielectric film group each have a refractive index $(n_2H)=1.64$, a thickness $(d_2H)=130$ nm, and an optical film thickness $(n_2H \times d_2H)=213$.

The low-refractive index layers in the second dielectric film group each have a refractive index $(n_2L)=1.57$, a thickness $(d_2L)=127$ nm, and an optical film thickness $(n_2L \times d_2L)=199$.

The high-refractive index layers in the third dielectric film group each have a refractive index $(n_3H)=1.64$, a thickness $(d_3H)=134$ nm, and an optical film thickness $(n_3H \times d_3H)=220$.

The low-refractive index layers in the third dielectric film group each have refractive index $(n_3L)=1.57$, a thickness $(d_3L)=130$ nm, and an optical film thickness $(n_3L \times d_3L)$ 204.

The high-refractive index layers in the fourth dielectric film group each have a refractive index $(n_4H)=1.64$, a thickness $(d_4H)=138$ nm, and an optical film thickness $(n_4H \times d_4H)=226$.

The low-refractive index layers in the fourth dielectric film group each have a refractive index $(n_4L)=1.57$, a thickness $(d_4L)=134$ nm, and an optical film thickness $(n_4L \times d_4L)=210$.

Accordingly, the relationships of the optical film thicknesses and the like are as follows.

$(d_1H \times n_1H)/(d_1L \times n_1L)=1.08$ $(d_2H \times n_2H)/(d_2L \times n_2L)=1.07$ $d_2H/d_1H=1.02$ $d_2L/d_1L=1.03$ $(d_2H \times n_2H)/(d_1H \times n_1H)=1.02$ $(d_2L \times n_2L)/(d_1L \times n_1L)=1.03$ $(d_3H \times n_3H)/(d_3L \times n_3L)=1.08$ $(d_4H \times n_4H)/(d_4L \times n_4L)=1.08$ $d_4H/d_3H=1.03$ $d_4L/d_3L=1.03$ $(d_4H \times n_4H)/(d_3H \times n_3H)=1.03$ $(d_4L \times n_4L)/(d_3L \times n_3L)=1.03$ $nH/nL=1.04.$

Comparative Example 5

A near-infrared reflective film was produced in a similar method to that of Example 2, except that the thicknesses of the high-refractive index layers and low-refractive index layers were changed. The constitution of the obtained near-infrared reflective film is as follows.

The high-refractive index layers each have a refractive index $(nH)=1.64$, a thickness $(dH)=119$ nm, and an optical film thickness $(nH \times dH)=195$.

The low-refractive index layers each have a refractive index $(nL)=1.57$, a thickness $(dL)=124$ nm, and an optical film thickness $(nL \times dL)=195$.

Accordingly, the relationships of the optical film thicknesses and the like are as follows.

$(dH \times nH)/(dL \times nL)=1.00$ $nH/nL=1.04.$

Comparative Example 6

A near-infrared reflective film was produced in a similar method to that of Example 2, except that the thicknesses of the high-refractive index layers and low-refractive index layers were changed. The constitution of the obtained near-infrared reflective film is as follows.

The high-refractive index layers each have a refractive index $(nH)=1.64$, a thickness $(dH)=133$ nm, and an optical film thickness $(nH \times dH)=218$.

The low-refractive index layers each have a refractive index $(nL)=1.57$, a thickness $(dL)=111$ nm, and an optical film thickness $(nL \times dL)=174$.

Accordingly, the relationships of the optical film thicknesses and the like are as follows.

$(dH \times nH)/(dL \times nL)=1.25$ $nH/nL=1.04.$

Comparative Example 7

A near-infrared reflective film was produced in a similar method to that of Example 2, except that the thicknesses of the high-refractive index layers and low-refractive index layers were changed. The constitution of the obtained near-infrared reflective film is as follows.

The high-refractive index layers each have a refractive index $(nH)=1.64$, a thickness $(dH)=110$ nm, and an optical film thickness $(nH \times dH)=180$.

The low-refractive index layers each have a refractive index $(nL)=1.57$, a thickness $(dL)=138$ nm, and an optical film thickness $(nL \times dL)=217$.

Accordingly, the relationships of the optical film thicknesses and the like are as follows.

$(dH \times nH)/(dL \times nL)=0.83$ $nH/nL=1.04.$

Example 6

A 3% by mass aqueous solution of an unmodified polyvinyl alcohol (PVA217, polymerization degree: 1700, saponification degree: 88%, Manufactured by Kuraray Co., Ltd.) containing 70 parts by mass of colloidal silica (Snowtex OXS, average particle size: 5 nm, manufactured by Nissan Chemical Industries, Ltd.) was prepared as a first application liquid. Furthermore, a 4% by mass aqueous solution of an unmodified polyvinyl alcohol (PVA124, polymerization degree: 2400, saponification degree: 99%, Manufactured by Kuraray Co., Ltd.) containing 85 parts by mass of titanium oxide (sws, average particle diameter: 8 nm, manufactured by Sakai Chemical Industry Co., Ltd.) was prepared as a second application liquid.

The above-mentioned first application liquid and the above-mentioned second application liquid were alternately applied by using a slide coater onto a polyester film that had undergone an easy adhesion treatment, and dried to thereby produce a near-infrared reflective film of 24 layers According to the relationship of the values of the refractive indices, the layers formed by the first application liquid (containing colloidal silica) are low-refractive index layers (refractive index: 1.45), and the layers formed by the second application liquid (containing titanium oxide) are high-refractive index layers (refractive index: 1.95). Furthermore, the lowermost layer adjacent to the base material is a high-refractive index layer. The constitution of the obtained near-infrared reflective film is as follows.

The first layer to the sixth layer are in a first dielectric film group.
The seventh layer to the twelfth layer are in a second dielectric film group.
The $13^{th}$ layer to the $18^{th}$ layer are in a third dielectric film group.
The $19^{th}$ layer to the $24^{th}$ layer are in a fourth dielectric film group.
The high-refractive index layers in the first dielectric film group each have a refractive index $(n_1H)=1.95$, a thickness $(d_1H)=118$ nm, and an optical film thickness $(n_1H \times d_1H)=230$.
The low-refractive index layers in the first dielectric film group each have a refractive index $(n_1L)=1.45$, a thickness $(d_1L)=152$ nm, and an optical film thickness $(n_1L \times d_1L)=220$.
The high-refractive index layers in the second dielectric film group each have a refractive index $(n_2H)=1.95$, a thickness $(d_2H)=128$ nm, and an optical film thickness $(n_2H \times d_2H)=250$.
The low-refractive index layers in the second dielectric film group each have a refractive index $(n_2L)=1.45$, a thickness $(d_2L)=164$ nm, and an optical film thickness $(n_2L \times d_2L)=238$.
The high-refractive index layers in the third dielectric film group each have a refractive index $(n_3H)=1.95$, a thickness $(d_3H)=138$ nm, and an optical film thickness $(n_3H \times d_3H)=269$.
The low-refractive index layers in the third dielectric film group each have refractive index $(n_3L)=1.45$, a thickness $(d_3L)=177$ nm, and an optical film thickness $(n_3L \times d_3L)=257$.
The high-refractive index layers in the fourth dielectric film group each have a refractive index $(n_4H)=1.95$, a thickness $(d_4H)=149$ nm, and an optical film thickness $(n_4H \times d_4H)=291$.
The low-refractive index layers in the fourth dielectric film group each have a refractive index $(n_4L)=1.45$, a thickness $(d_4L)=191$ nm, and an optical film thickness $(n_4L \times d_4L)=277$.

Accordingly, the relationships of the optical film thicknesses and the like are as follows.

$(d_1H \times n_1H)/(d_1L \times n_1L)=1.05$ $(d_2H \times n_2H)/(d_2L \times n_2L)=1.05$ $d_2H/d_1H=1.08$ $d_2L/d_1L=1.08$ $(d_2H \times n_2H)/(d_1H \times n_1H)=1.09$ $(d_2L \times n_2L)/(d_1L \times n_1L)=1.08$ $(d_3H \times n_3H)/(d_3L \times n_3L)=1.05$ $(d_4H \times n_4H)/(d_4L \times n_4L)=1.05$ $d_4H/d_3H=1.08$ $d_4L/d_3L=1.08$ $(d_4H \times n_4H)/(d_3H \times n_3H)=1.08$ $(d_4L \times n_4L)/(d_3L \times n_3L)=1.08$ $nH/nL=1.34$.

Example 7

A near-infrared reflective film was produced in a similar method to that of Example 6, except that the thicknesses of the high-refractive index layers and low-refractive index layers were changed. The constitution of the obtained near-infrared reflective film is as follows.

The first layer to the sixth layer are in a first dielectric film group.
The seventh layer to the twelfth layer are in a second dielectric film group.
The $13^{th}$ layer to the $18^{th}$ layer are in a third dielectric film group.
The $19^{th}$ layer to the $24^{th}$ layer are in a fourth dielectric film group.
The high-refractive index layers in the first dielectric film group each have a refractive index $(n_1H)=1.95$, a thickness $(d_1h)=118$ nm, and an optical film thickness $(n_1H \times d_1H)=230$.
The low-refractive index layers in the first dielectric film group each have a refractive index $(n_1L)=1.45$, a thickness $(d_1L)=152$ nm, and an optical film thickness $(n_1L \times d_1L)=220$.
The high-refractive index layers in the second dielectric film group each have a refractive index $(n_2H)=1.95$, a thickness $(d_2H)=122$ nm, and an optical film thickness $(n_2H \times d_2H)=238$.
The low-refractive index layers in the second dielectric film group each have a refractive index $(n_2L)=1.45$, a thickness $(d_2L)=156$ nm, and an optical film thickness $(n_2L \times d_2L)=226$.
The high-refractive index layers in the third dielectric film group each have a refractive index $(n_3H)=1.95$, a thickness $(d_3H)=126$ nm, and an optical film thickness $(n_3H \times d_3H)=246$.

The low-refractive index layers in the third dielectric film group each have refractive index ($n_3L$)=1.45, a thickness ($d_3L$)=161 nm, and an optical film thickness ($n_3L \times d_3L$)=233.

The high-refractive index layers in the fourth dielectric film group each have a refractive index ($n_4H$)=1.95, a thickness ($d_4H$)=129 nm, and an optical film thickness ($n_4H \times d_4H$)=252.

The low-refractive index layers in the fourth dielectric film group each have a refractive index ($n_4L$)=1.45, a thickness ($d_4L$)=166 nm, and an optical film thickness ($n_4L \times d_4L$)=241.

Accordingly, the relationships of the optical film thicknesses and the like are as follows.

$(d_1H \times n_1H)/(d_1L \times n_1L)=1.05$ $(d_2H \times n_2H)/(d_2L \times n_2L)=1.05$ $d_2H/d_1H=1.03$ $d_2L/d_1L=1.03$ $(d_2H \times n_2H)/(d_1H \times n_1H)=1.03$ $(d_2L \times n_2L)/(d_1L \times n_1L)=1.03$ $(d_3H \times n_3H)/(d_3L \times n_3L)=1.06$ $(d_4H \times n_4H)/(d_4L \times n_4L)=1.05$ $d_4H/d_3H=1.02$ $d_4L/d_3L=1.03$ $(d_4H \times n_4H)/(d_3H \times n_3H)=1.02$ $(d_4L \times n_4L)/(d_3L \times n_3L)=1.03$ $nH/nL=1.34$.

Example 8

A near-infrared reflective film was produced in a similar method to that of Example 6, except that the thicknesses of the high-refractive index layers and low-refractive index layers were changed. The constitution of the obtained near-infrared reflective film is as follows.

The first layer to the sixth layer are in a first dielectric film group.

The seventh layer to the twelfth layer are in a second dielectric film group.

The $13^{th}$ layer to the $18^{th}$ layer are in a third dielectric film group.

The $19^{th}$ layer to the $24^{th}$ layer are in a fourth dielectric film group.

The high-refractive index layers in the first dielectric film group each have a refractive index ($n_1H$)=1.95, a thickness ($d_1H$)=122 nm, and an optical film thickness ($n_1H \times d_1H$)=238.

The low-refractive index layers in the first dielectric film group each have a refractive index ($n_1L$)=1.45, a thickness ($d_1L$)=152 nm, and an optical film thickness ($n_1L \times d_1L$)=220.

The high-refractive index layers in the second dielectric film group each have a refractive index ($n_2H$)=1.95, a thickness ($d_2H$)=126 nm, and an optical film thickness ($n_2H \times d_2H$)=246.

The low-refractive index layers in the second dielectric film group each have a refractive index ($n_2L$)=1.45, a thickness ($d_2L$)=156 nm, and an optical film thickness ($n_2L \times d_2L$)=226.

The high-refractive index layers in the third dielectric film group each have a refractive index ($n_3H$)=1.95, a thickness ($d_3H$)=129 nm, and an optical film thickness ($n_3H \times d_3H$)=252.

The low-refractive index layers in the third dielectric film group each have refractive index ($n_3L$)=1.45, a thickness ($d_3L$)=161 nm, and an optical film thickness ($n_3L \times d_3L$)=233.

The high-refractive index layers in the fourth dielectric film group each have a refractive index ($n_4H$)=1.95, a thickness ($d_4H$)=133 nm, and an optical film thickness ($n_4H \times d_4H$)=259.

The low-refractive index layers in the fourth dielectric film group each have a refractive index ($n_4L$)=1.45, a thickness ($d_4L$)=166 nm, and an optical film thickness ($n_4L \times d_4L$)=241.

Accordingly, the relationships of the optical film thicknesses and the like are as follows.

$(d_1H \times n_1H)/(d_1L \times n_1L)=1.08$ $(d_2H \times n_2H)/(d_2L \times n_2L)=1.09$ $d_2H/d_1H=1.03$ $d_2L/d_1L=1.03$ $(d_2H \times n_2H)/d_1H \times n_1H)=1.03$ $(d_2L \times n_2L)/(d_1L \times n_1L)=1.03$ $(d_3H \times n_3H)/(d_3L \times n_3L)=1.08$ $(d_4H \times n_4H)/(d_4L \times n_4L)=1.07$ $d_4H/d_3H=1.02$ $d_4L/d_3L=1.03$ $(d_4H \times n_4H)/(d_3H \times n_3H)=1.03$ $(d_4L \times n_4L)/(d_3L \times n_3L)=1.03$ $nH/nL=1.34$.

Example 9

A near-infrared reflective film was produced in a similar method to that of Example 6, except that the thicknesses of the high-refractive index layers and low-refractive index layers were changed. The constitution of the obtained near-infrared reflective film is as follows.

The first layer to the sixth layer are in a first dielectric film group.

The seventh layer to the twelfth layer are in a second dielectric film group.

The $13^{th}$ layer to the $18^{th}$ layer are in a third dielectric film group.

The $19^{th}$ layer to the $24^{th}$ layer are in a fourth dielectric film group.

The high-refractive index layers in the first dielectric film group each have a refractive index ($n_1H$)=1.95, a thickness ($d_1H$)=110 nm, and an optical film thickness ($n_1H \times d_1H$)=215.

The low-refractive index layers in the first dielectric film group each have a refractive index ($n_1L$)=1.45, a thickness ($d_1L$)=159 nm, and an optical film thickness ($n_1L \times d_1L$)=231.

The high-refractive index layers in the second dielectric film group each have a refractive index ($n_2H$)=1.95, a thickness ($d_2H$)=113 nm, and an optical film thickness ($n_2H \times d_2H$)=220.

The low-refractive index layers in the second dielectric film group each have a refractive index ($n_2L$)=1.45, a thickness ($d_2L$)=163 nm, and an optical film thickness ($n_2L \times d_2L$)=236.

The high-refractive index layers in the third dielectric film group each have a refractive index ($n_3H$)=1.95, a thickness ($d_3H$)=116 nm, and an optical film thickness ($n_3H \times d_3H$)=226.

The low-refractive index layers in the third dielectric film group each have refractive index ($n_3L$)=1.45, a thickness ($d_3L$)=168 nm, and an optical film thickness ($n_3L \times d_3L$)=243.

The high-refractive index layers in the fourth dielectric film group each have a refractive index ($n_4H$)=1.95, a thickness ($d_4H$)=120 nm, and an optical film thickness ($n_4H \times d_4H$)=234.

The low-refractive index layers in the fourth dielectric film group each have a refractive index ($n_4L$)=1.45, thickness ($d_4L$)=173 nm, and an optical film thickness ($n_4L \times d_4L$)=251.

Accordingly, the relationships of the optical film thicknesses and the like are as follows.

$$(d_1H \times n_1H)/(d_1L \times n_1L)=0.93$$

$$(d_2H \times n_2H)/(d_2L \times n_2L)=0.93$$

$$d_2H/d_1H=1.03$$

$$d_2L/d_1L=1.03$$

$$(d_2H \times n_2H)/(d_1H \times n_1H)=1.03$$

$$(d_2L \times n_2L)/(d_1L \times n_1L)=1.03$$

$$(d_3H \times n_3H)/(d_3L \times n_3L)=0.93$$

$$(d_4H \times n_4H)/(d_4L \times n_4L)=0.93$$

$$d_4H/d_3H=1.03$$

$$d_4L/d_3L=1.03$$

$$(d_4H \times n_4H)/(d_3H \times n_3H)=1.04$$

$$(d_4L \times n_4L)/(d_3L \times n_3L)=1.03$$

$$nH/nL=1.34.$$

Comparative Example 8

A near-infrared reflective film was produced in a similar method to that of Example 6, except that the thicknesses of the high-refractive index layers and low-refractive index layers were changed. The constitution of the obtained near-infrared reflective film is as follows.

The high-refractive index layers each have a refractive index (nH)=1.95, a thickness (dH)=112 nm, and an optical film thickness (nH×dH)=218.

The low-refractive index layers each have a refractive index (nL)=1.45, a thickness (dL)=150 nm, and an optical film thickness (nL×dL)=218.

Accordingly, the relationships of the optical film thicknesses and the like are as follows.

$$(dH \times nH)/(dL \times nL)=1.00$$

$$nH/nL=1.34.$$

Comparative Example 9

A near-infrared reflective film was produced in a similar method to that of Example 6, except that the thicknesses of the high-refractive index layers and low-refractive index layers were changed. The constitution of the obtained near-infrared reflective film is as follows.

The high-refractive index layers each have a refractive index (nH)=1.95, a thickness (dH)=98 nm, and an optical film thickness (nH×dH)=191.

The low-refractive index layers each have a refractive index (nL)=1.45, a thickness (dL)=166 nm, and an optical film thickness (nL×dL)=241.

Accordingly, the relationships of the optical film thicknesses and the like are as follows.

$$(dH \times nH)/(dL \times nL)=0.79$$

$$nH/nL=1.34.$$

Comparative Example 10

A near-infrared reflective film was produced in a similar method to that of Example 6, except that the thicknesses of the high-refractive index layers and low-refractive index layers were changed. The constitution of the obtained near-infrared reflective film is as follows.

The high-refractive index layers each have a refractive index (nH)=1.95, a thickness (dH)=135 nm, and an optical film thickness (nH×dH)=263.

The low-refractive index layers each have a refractive index (nL)=1.45, a thickness (dL)=152 nm, and an optical film thickness (nL×dL)=220.

Accordingly, the relationships of the optical film thicknesses and the like are as follows.

$$(dH \times nH)/(dL \times nL)=1.20$$

$$nH/nL=1.34.$$

(Measurement of Visible Ray Reflectance and Near-Infrared Ray Reflectance)

For each of the near-infrared reflective films obtained in Examples and Comparative Examples, the visible ray reflectance (400 to 740 nm) and near-infrared ray reflectance (800 to 1300 nm) were obtained under a condition of 5° positive reflection by using a spectrometer U-4100 (manufactured by Hitachi Corporation). Furthermore, the ratio of the visible ray reflectance to the near-infrared ray reflectance (reflectance ratio=visible ray reflectance/near-infrared ray reflectance) was calculated. At this time, a smaller reflectance ratio is more preferable, and the reflectance ratio can be an index of whether or not the near-infrared reflective film has an excellent reflection peak such that the reflection peaks in the visible region are suppressed, but the reflection peak in the near-infrared region is not attenuated.

The obtained results are shown in the following Table 1, together with whether or not the following formulas (1) to (7) are satisfied. O is described in the case when each of the formulas (1) to (7) is satisfied, and x is described in the case when each formula is not satisfied.

[Mathematical Formula 19]

$$1.1 \geq (dH \times nH)/(dL \times nL) > 1 \text{ or}$$
$$1 > (dH \times nH)/(dL \times nL) \geq 0.9 \quad (1)$$

$$1.10 \geq d_2H/d_1H > 1 \text{ and } 1.10 \geq d_2L/d_1L > 1 \quad (2)$$

$$1.06 \geq (d_1H \times n_1H)/(d_1L \times n_1L) > 1 \text{ or}$$
$$1 > (d_1H \times n_1H)/(d_1L \times n_1L) \geq 0.94 \quad (3)$$

$$1.06 \geq (d_2H \times n_2H)/(d_2L \times n_2L) > 1 \text{ or}$$
$$1 > (d_2H \times n_2H)/(d_2L \times n_2L) \geq 0.94 \quad (4)$$

$$1.10 \geq (d_2H \times n_2H)/(d_1H \times n_1H) > 1.06 \quad (5)$$

$$1.10 \geq (d_2L \times n_2L)/(d_1L \times n_1L) > 1.06 \quad (6)$$

$$2 > nH/nL \geq 1.1 \quad (7)$$

Furthermore, the graphs of the reflection peaks of typical Examples and Comparative Examples (Example 1, Comparative Examples 1 and 3, Example 2, Comparative Example 5, Examples 6 to 8, and Comparative Example 8) are shown in FIG. 2 to FIG. 10.

low value, and thus the reflectance ratio consequently showed the most excellent value.

In Comparative Example 1, the formulas (1) to (6) are not satisfied, and the high-refractive index layers and low-refractive index layers have the same optical film thickness ratio. Furthermore, with respect to Comparative Example 2, the formulas (1) to (6) are not satisfied, and the high-refractive index layers and low-refractive index layers have different optical film thicknesses, but the values thereof are significantly different. In the near-infrared reflective films of Comparative Example 1 and Comparative Example 2, the visible ray reflectances showed relatively high values, and thus the reflectance ratios showed higher values than that of the near-infrared reflective film of Example 1.

Comparative Example 3 and Comparative Example 4 satisfy the formulas (1) and (7), but do not satisfy the formulas (2) to (6). Since the near-infrared reflective films of Comparative Example 3 and Comparative Example 4 showed visible ray reflectances of relatively high values, the reflectance ratios showed higher values than that of the near-infrared reflective film of Example 1.

(Regarding Examples 2 to 5 and Comparative Examples 5 to 7)

In Examples 2 to 5 and Comparative Examples 5 to 7, the refractive index layers contain resins. These near-infrared reflective films have lower visible ray reflectance and also

TABLE 1

|  | Formula (1) | Formula (2) | Formula (3) | Formula (4) | Formula (5) | Formula (6) | Formula (7) | Visible ray reflectance | Near infrared ray reflectance | Reflectance ratio |
|---|---|---|---|---|---|---|---|---|---|---|
| Example 1 | o | o | o | o | o | o | o | 14.6 | 96.4 | 15.1 |
| Comparative Example 1 | x | x | x | x | x | x | o | 16.7 | 97.6 | 17.1 |
| Comparative Example 2 | x | x | x | x | x | x | o | 27.9 | 97.6 | 28.6 |
| Comparative Example 3 | o | x | x | x | x | x | o | 16.8 | 97.5 | 17.2 |
| Comparative Example 4 | o | x | x | x | x | x | o | 16.1 | 98.8 | 16.3 |
| Example 2 | o | o | o | o | o | o | x | 5.57 | 22.6 | 24.6 |
| Example 3 | o | o | o | o | x | x | x | 5.62 | 18.2 | 30.9 |
| Example 4 | o | o | x | x | x | x | x | 5.74 | 17.6 | 32.6 |
| Example 5 | o | o | x | x | x | x | x | 5.55 | 17.0 | 32.6 |
| Comparative Example 5 | x | x | x | x | x | x | x | 6.19 | 6.06 | 102 |
| Comparative Example 6 | x | x | x | x | x | x | x | 5.46 | 6.49 | 84.1 |
| Comparative Example 7 | x | x | x | x | x | x | x | 6.23 | 6.91 | 90.2 |
| Example 6 | o | o | o | o | o | o | o | 9.60 | 60.1 | 15.9 |
| Example 7 | o | o | o | o | x | x | o | 9.20 | 52.0 | 17.7 |
| Example 8 | o | o | x | x | x | x | o | 9.60 | 53.0 | 18.1 |
| Example 9 | o | o | x | x | x | x | o | 9.80 | 50.8 | 19.3 |
| Comparative Example 8 | x | x | x | x | x | x | o | 10.5 | 45.6 | 23.0 |
| Comparative Example 9 | x | x | x | x | x | x | o | 15.0 | 43.5 | 34.5 |
| Comparative Example 10 | x | x | x | x | x | x | o | 11.4 | 53.0 | 21.5 |

(Regarding Example 1 and Comparative Examples 1 to 4)

The near-infrared reflective films of Example 1 and Comparative Examples 1 to 4 were produced by a sputtering process. These near-infrared reflective films have high near-infrared ray reflectances in whole, and also showed high values for the visible ray reflectances.

In Example 1, all of the formulas (1) to (7) were satisfied, and when compared with Comparative Examples 1 to 4, the value of the near-infrared ray reflectance was relatively slightly lowered, but the visible ray reflectance showed a had lower near-infrared ray reflectances as compared to those of the near-infrared reflective films produced by the above-mentioned sputtering process. In Examples 2 to 5 and Comparative Examples 5 to 7, the dielectric multilayer film has two dielectric film group sets, and each of the dielectric film groups that constitute the respective dielectric film group sets (first to fourth dielectric film groups) is constituted by alternately layering 16 high-refractive index layers and 16 low-refractive index layers, respectively. The dielectric film group set including the third dielectric film group and fourth dielectric film group has similar optical film thicknesses and the like to those of the dielectric film group set including the first dielectric film group and second dielectric film group. Accordingly, in the case when the dielectric film group set including the first dielectric film group and second dielectric film group satisfies or does not satisfy the formulas (1) to (7), respectively, the dielectric film group set including the third dielectric film group and fourth dielectric film group also satisfies or does not satisfy the formulas (1) to (7), respectively.

Example 2 satisfies the formulas (1) to (6), and shows visible ray reflectances of relatively lower values and near-infrared reflectances of higher values as compared to those of Examples 3 to 5 and Comparative Examples 5 to 7. Consequently, Example 2 showed the most excellent value as the reflectance ratio.

Example 3 satisfied the formulas (1) to (4), and showed a reflectance ratio of the second most excellent value after the near-infrared reflective film of Example 2.

Either of Example 4 and Example 5 satisfied the formulas (1) and (2), and the reflectance ratios showed the second finest values after the near-infrared reflective film of Example 3.

Comparative Example 5 does not satisfy the formulas (1) to (7), and the high-refractive index layers and low-refractive index layers have the same optical film thickness ratio. Furthermore, Comparative Examples 6 and 7 also do not satisfy the formulas (1) to (7), and the high-refractive index layers and low-refractive index layers have different optical film thicknesses, and the values thereof are significantly different. In the near-infrared reflective films of Comparative Examples 5 to 7, the near-infrared reflectances were significantly lowered, and the values of the reflectance ratios were very high.

(Regarding Examples 6 to 9 and Comparative Examples 8 to 10)

In Examples 6 to 9 and Comparative Examples 8 to 10, the refractive index layers contain metal oxide particles together with resins. These near-infrared reflective films show intermediate visible ray reflectances and near-infrared ray reflectances between the near-infrared reflective films produced by the above-mentioned sputtering process and the near-infrared reflective film in which the above-mentioned refractive index layers contain resin but are free from metal oxide particles. In Examples 6 to 9 and Comparative Examples 8 to 10, the dielectric multilayer film has two dielectric film group sets, and each of the dielectric film groups (first to fourth dielectric film groups) constituting the dielectric film group sets is constituted by alternately layering three high-refractive index layers and three low-refractive index layers, respectively. Furthermore, the dielectric film group set including the third dielectric film group and fourth dielectric film group has a similar optical film thickness and the like to those of the dielectric film group set including the first dielectric film group and second dielectric film group. Accordingly, in the case when the dielectric film group set including the first dielectric film group and second dielectric film group satisfies or does not satisfy the formulas (1) to (7), respectively, the dielectric film group set including the third dielectric film group and fourth dielectric film group also satisfies or does not satisfy the formulas (1) to (7), respectively.

Example 6 satisfied all of the formulas (1) to (7), and showed lower visible ray reflectance and higher near-infrared ray reflectance as compared to those of Examples 7 to 9 and Comparative Examples 8 to 10, and consequently showed a reflectance ratio of the most excellent value.

Example 7 satisfied all of the formulas (1) to (4) and (7), and showed a reflectance ratio of the second most excellent value after the near-infrared reflective film of Example 6.

Either of Example 8 and Example 9 satisfied the formulas (1), (2) and (7), and showed a reflectance ratio of the second finest value after the near-infrared reflective film of Example 3.

Comparative Example 8 does not satisfy the formulas (1) to (6), and the high-refractive index layers and low-refractive index layers have the same optical film thickness ratio. Furthermore, Comparative Examples 9 and 10 also do not satisfy the formulas (1) to (6), and the high-refractive index layers and low-refractive index layers have different optical film thicknesses, and the values thereof are significantly different. In the near-infrared reflective films of Comparative Examples 8 to 10, the visible ray reflectances were high and the near-infrared reflectances were low, and thus the values of the reflectance ratios showed high values.

(Regarding Graphs of Reflection Peaks)

Figure 2:
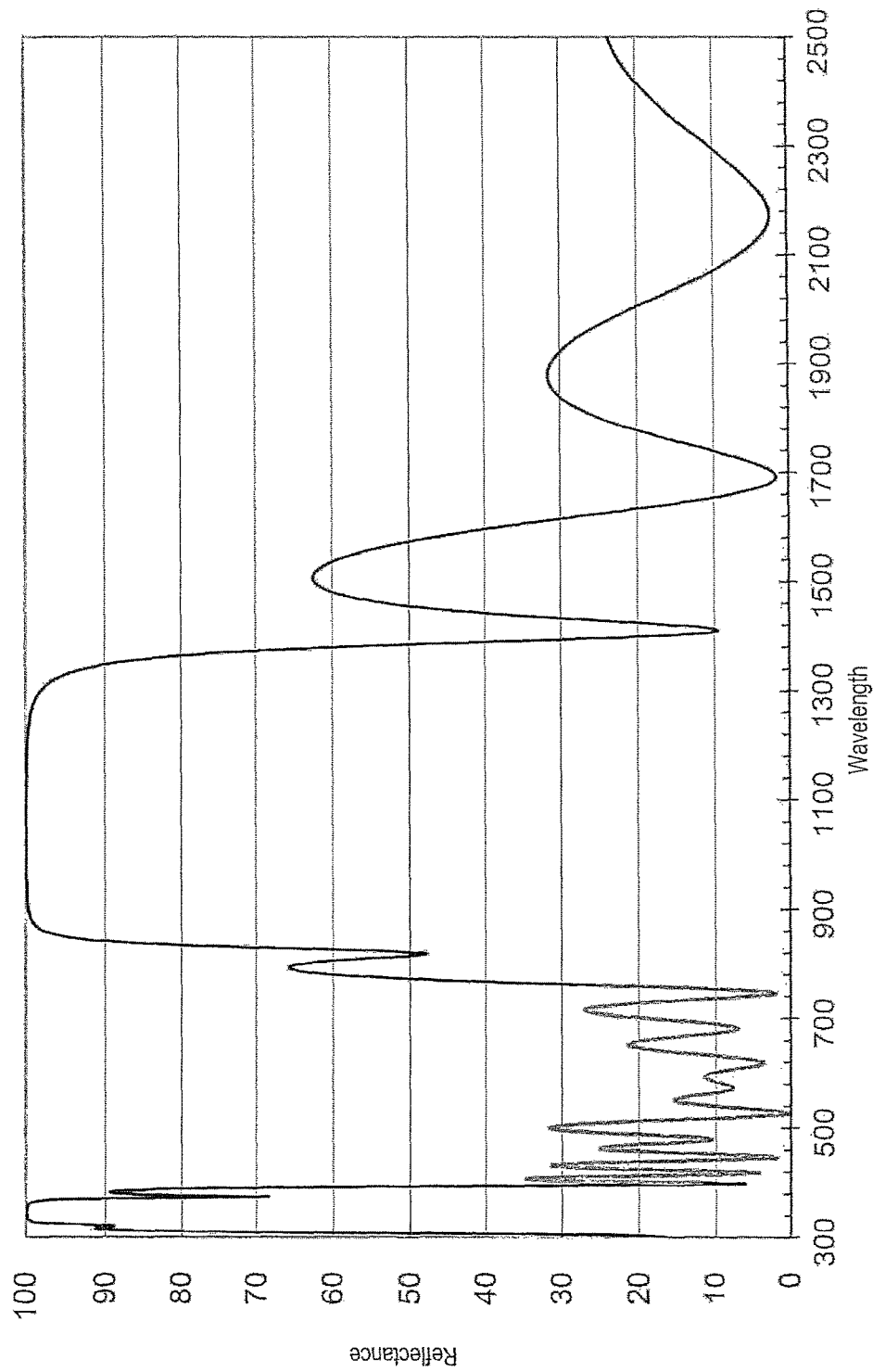
FIG. 2 is a graph showing the reflection peaks of the infrared reflective film produced in Example 1.
Figure 3:
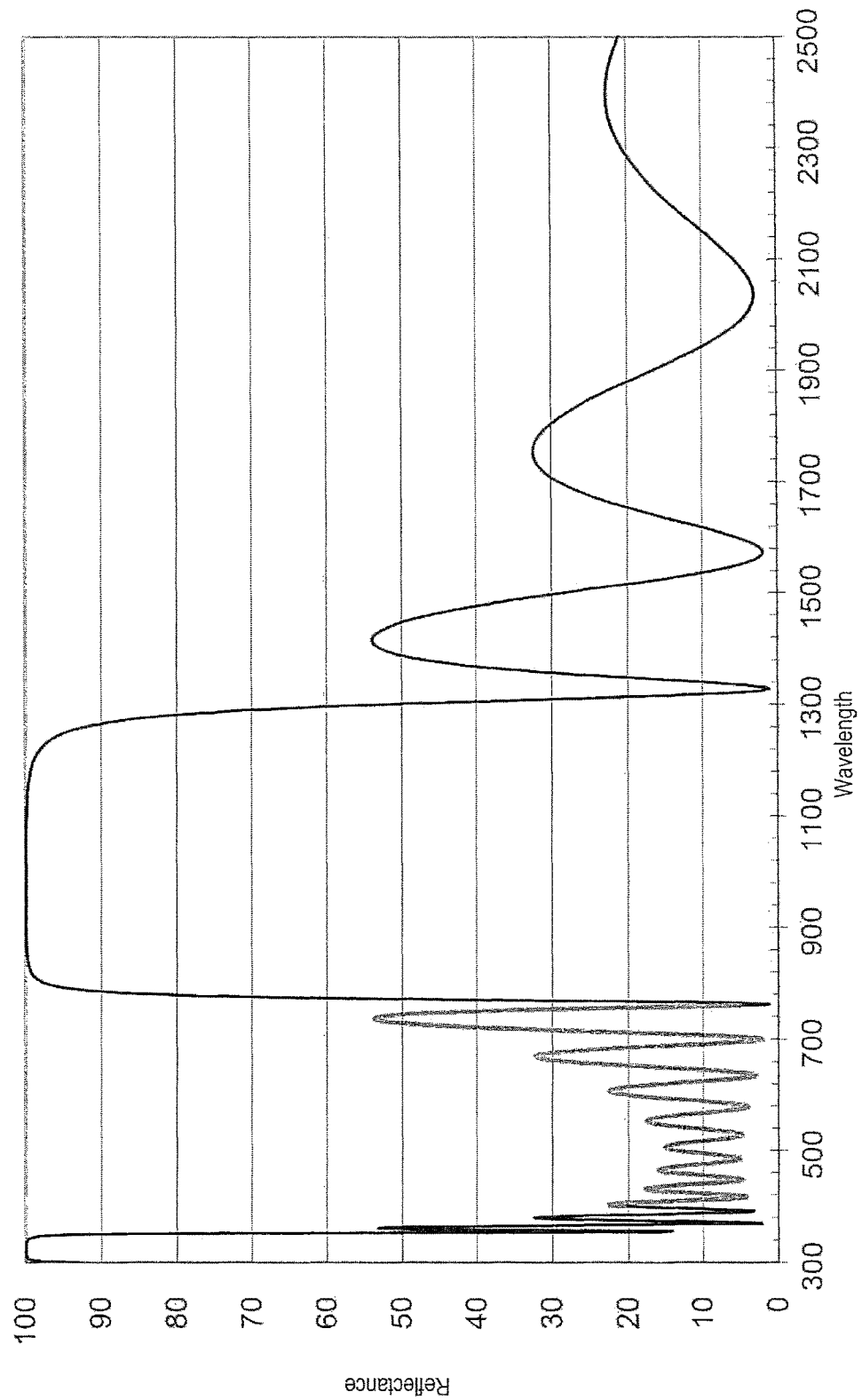
FIG. 3 is a graph showing the reflection peaks of the infrared reflective film produced in Comparative Example 1.
Figure 4:
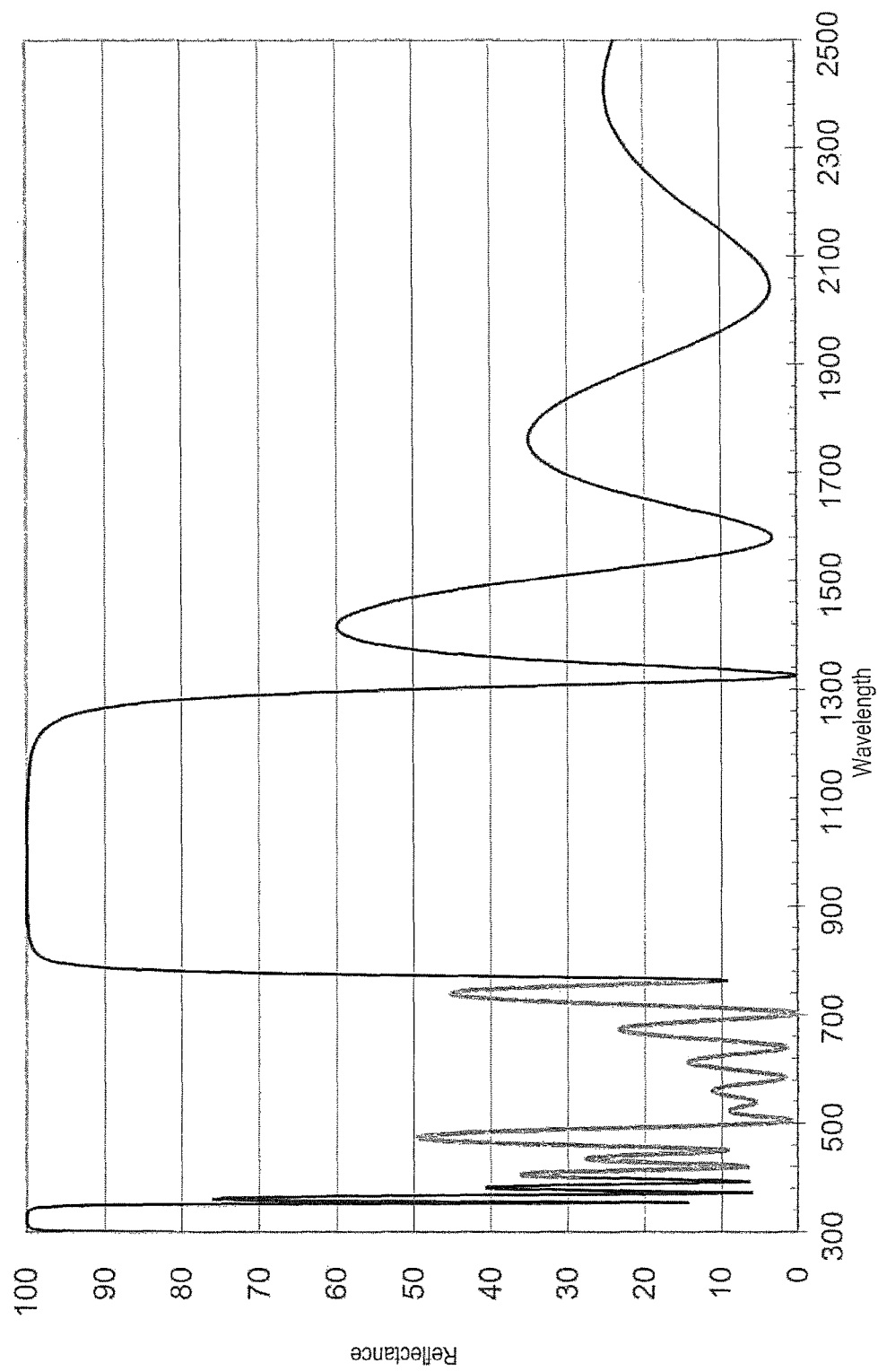
FIG. 4 is a graph showing the reflection peaks of the infrared reflective film produced in Comparative Example 3.

FIGS. 2 to 4 are graphs showing the reflection peaks of the near-infrared reflective films produced in Example 1, Comparative Example 1 and Comparative Example 3, respectively. In FIG. 3 (Comparative Example 1), since all of the optical film thicknesses of the refractive index layers are the same, generation of some ripples is observed. On the other hand, in FIG. 2 (Example 1), generation of ripples is suppressed. In FIG. 4 (Comparative Example 3), generation of ripples is slightly suppressed, but as is also apparent from the results in Table 1, it cannot be considered that the ripples are sufficiently suppressed.

Figure 5:
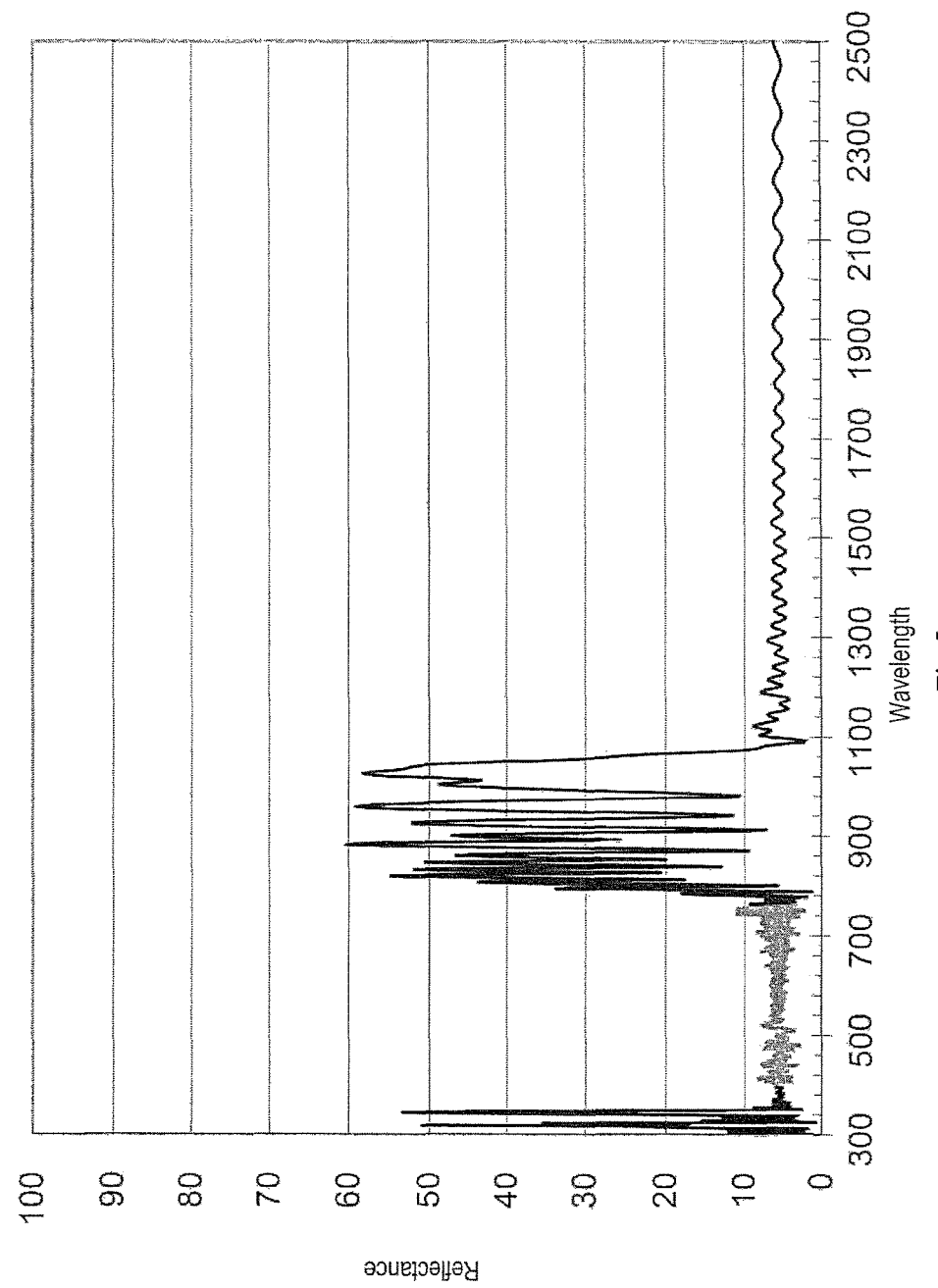
FIG. 5 is a graph showing the reflection peaks of the infrared reflective film produced in Example 2.
Figure 6:
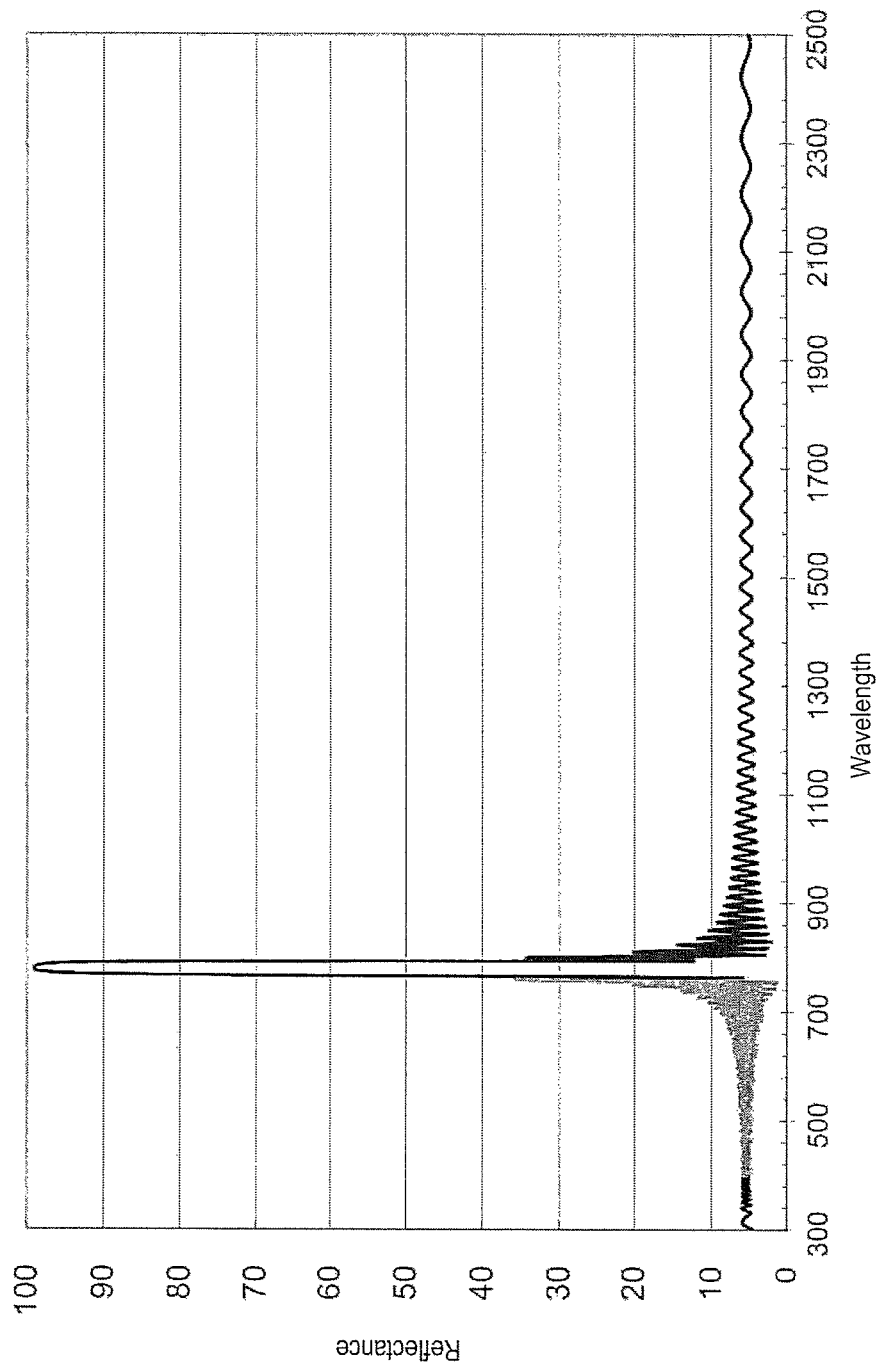
FIG. 6 is a graph showing the reflection peaks of the infrared reflective film produced in Comparative Example 5.
Figure 7:
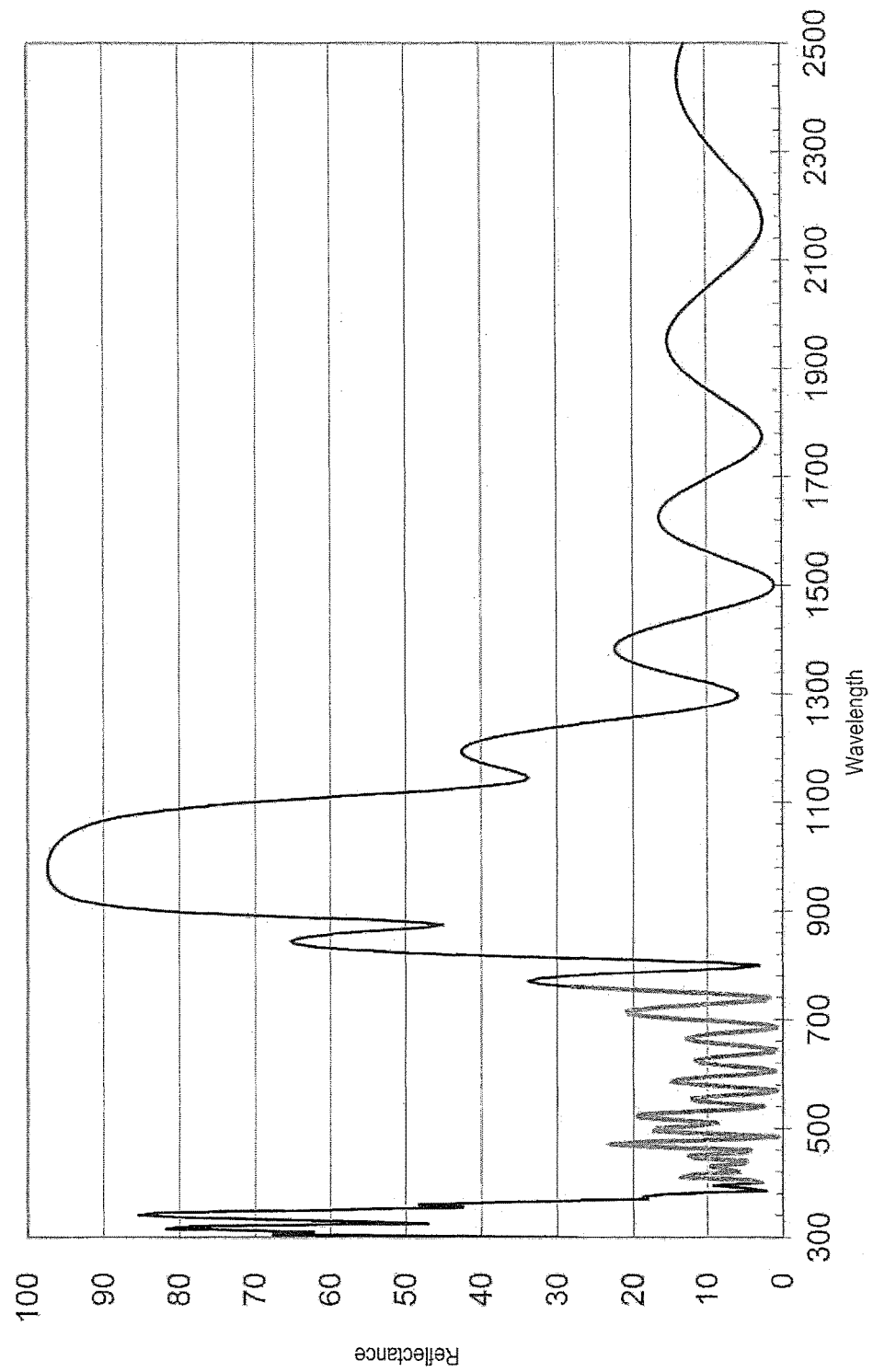
FIG. 7 is a graph showing the reflection peaks of the infrared reflective film produced in Example 6.
Figure 8:
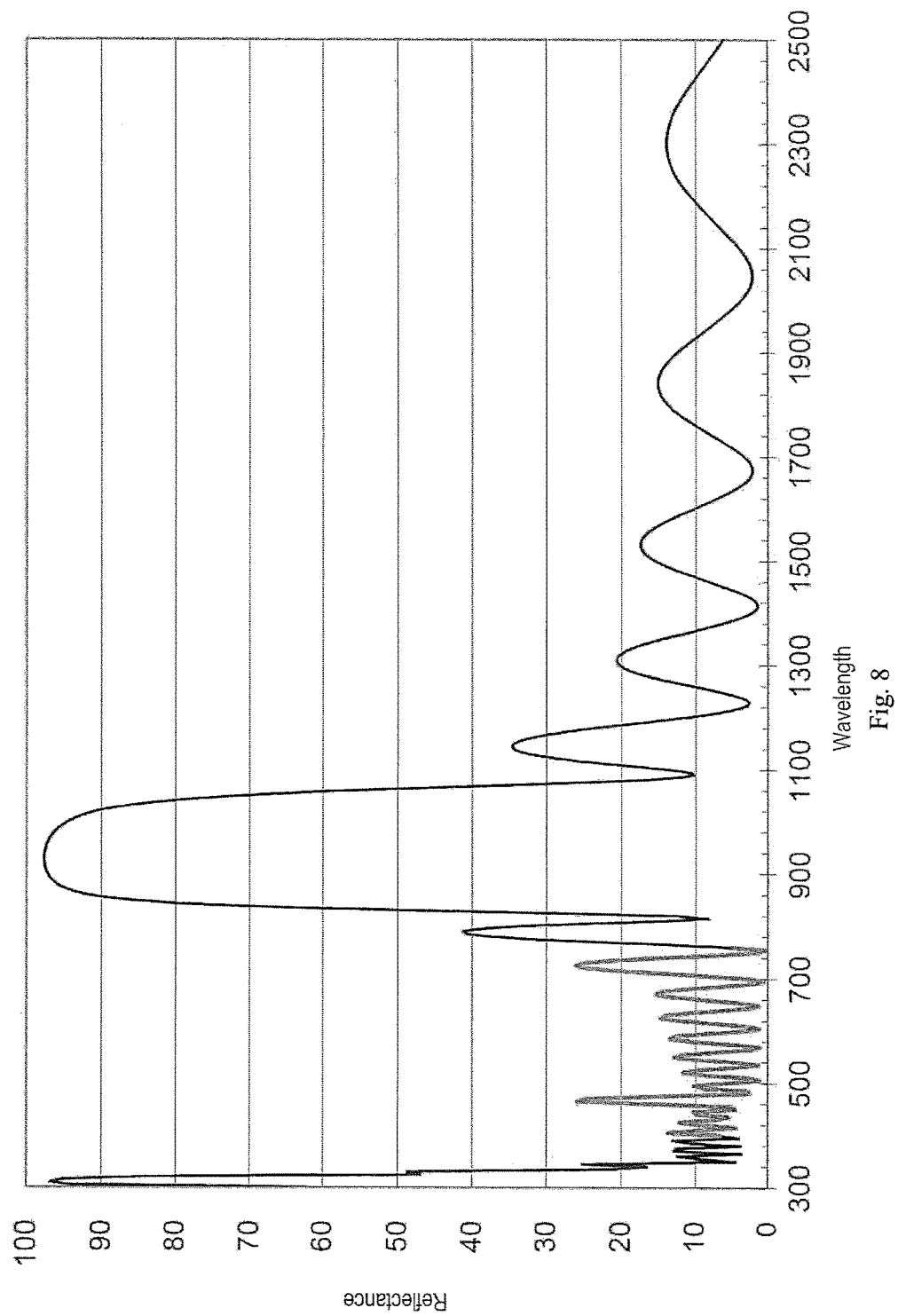
FIG. 8 is a graph showing the reflection peaks of the infrared reflective film produced in Example 7.
Figure 9:
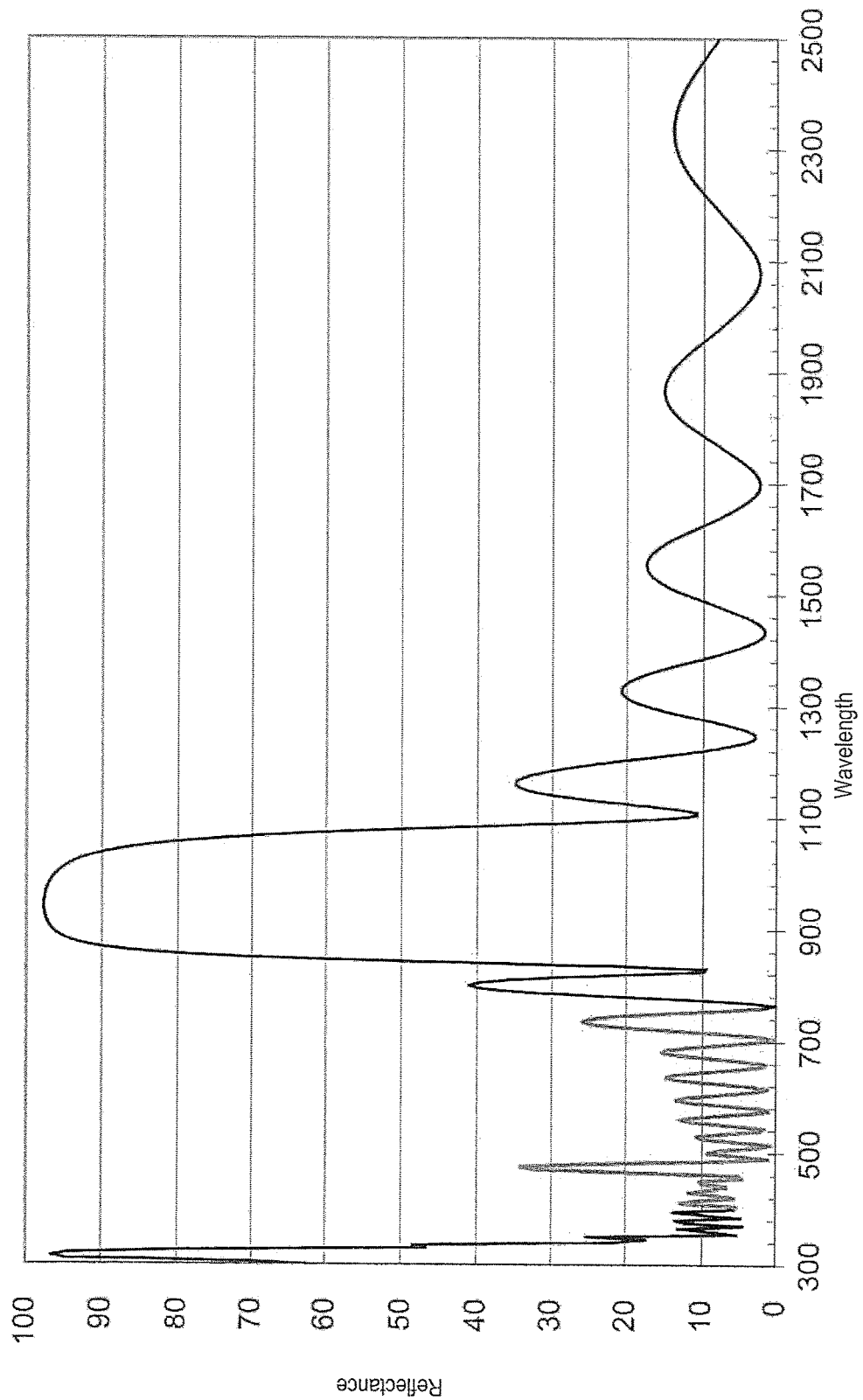
FIG. 9 is a graph showing the reflection peaks of the infrared reflective film produced in Example 8.

FIGS. 5 and 6 are graphs showing the reflection peaks of the near-infrared reflective films produced in Example 2 and Comparative Example 5, respectively. In FIG. 6 (Comparative Example 6), since all of the optical film thicknesses of the refractive index layers are the same, generation of ripples is observed. Furthermore, the rising of the reflection peak in the near-infrared region is sharp. It is considered from this result that the reflected lights are enhanced by each other by interference. On the other hand, in FIG. 5 (Example 2), the generation of ripples is suppressed. This is also apparent from the results in Table 1. Furthermore, the peak width of the reflection peak in the near-infrared region was broaden since different optical film thicknesses were provided. It is considered from this result that the interference of the reflected lights is weak.

Figure 10:
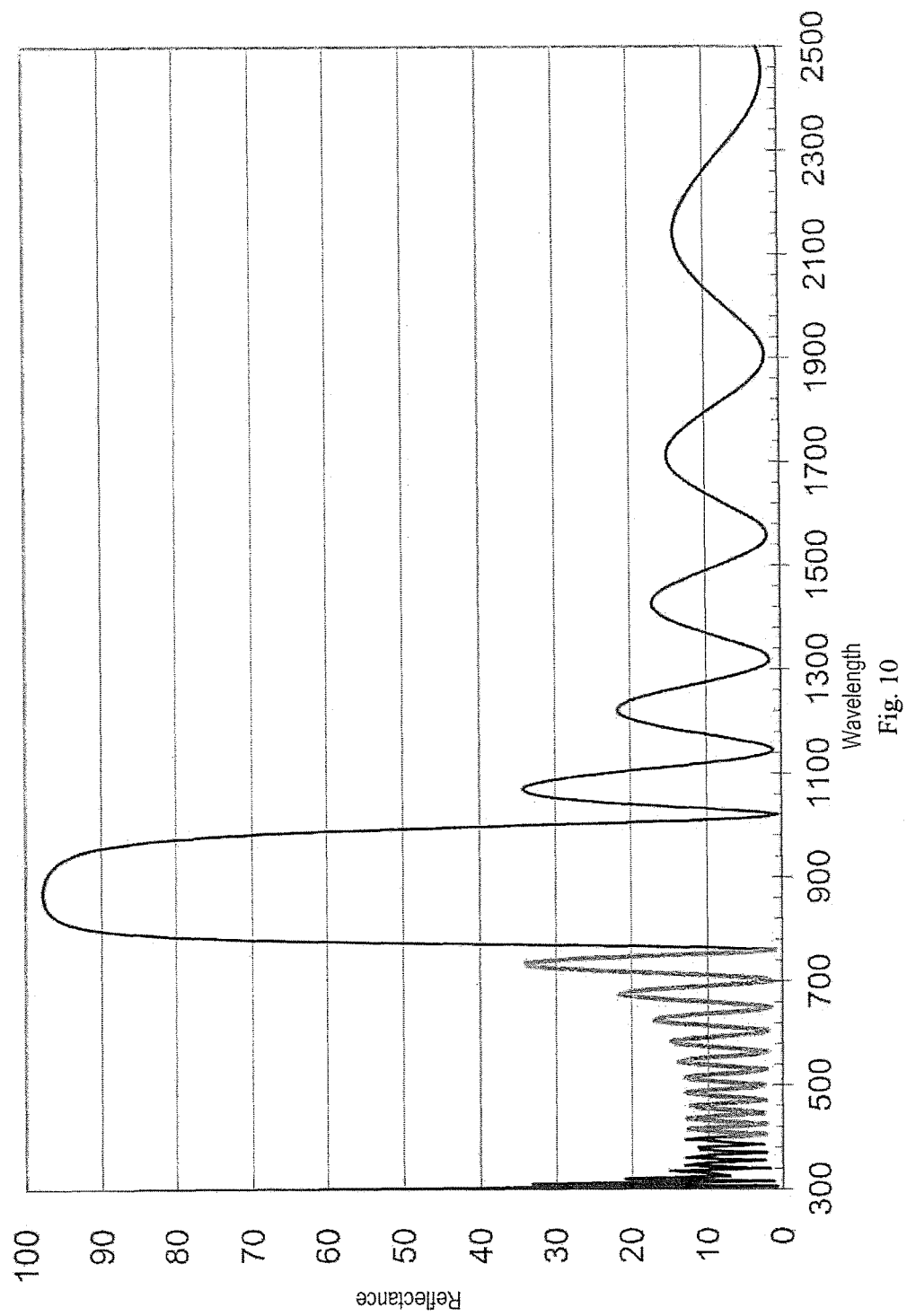
FIG. 10 is a graph showing the reflection peaks of the infrared reflective film produced in Comparative Example 8.

FIG. 7 to FIG. 10 are graphs showing the reflection peaks of the near-infrared reflective films produced in Examples 6 to 8 and Comparative Example 8, respectively. In FIG. 10 (Comparative Example 8), since all of the optical film thicknesses of the refractive index layers are the same, generation of ripples is observed. Furthermore, the rising of the reflection peak in the near-infrared region is sharp. On the other hand, in FIGS. 7 to 9 (Examples 6 to 8), although the peaks are different, generate of ripples is suppressed, and the peak width of reflection peak in the near-infrared region is broaden.

REFERENCE SIGNS LIST

1 Near-infrared reflective film
2 Support
3 Dielectric multilayer film
4 Low-refractive index layer
5 High-refractive index layer
6 First dielectric film group
7 Second dielectric film group
8 Dielectric film group set

The invention claimed is:

1. A near-infrared reflective film having a support, and a dielectric multilayer film disposed on the support, in which a high-refractive index layer and a low-refractive index layer are alternately layered, wherein any of the high-refractive index layer and the low-refractive index layer adjacent to said high-refractive index layer satisfy:

$$1.1 \geq (dH \times nH)/(dL \times nL) > 1 \text{ or}$$

$$1 > (dH \times nH)/(dL \times nL) \geq 0.9, \quad \text{[Mathematical Formula 1]}$$

wherein dH represents the thickness of the high-refractive index layer, nH represents the refractive index of the high-refractive-index layer, dL represents the thickness of the low-refractive index layer, nL represents the refractive index of the low-refractive index layer, dH×nH represents the optical film thickness of the high-refractive index layer, and dL×nL represents the optical film thickness of the low-refractive index layer, and the dielectric multilayer film has a dielectric film group set comprising:

a first dielectric film group including at least three high-refractive index layers (refractive index $n_1H$, thickness $d_1H$) and at least three low-refractive index layers (refractive index $n_1L$, thickness $d_1L$), respectively, wherein the thickness $d_1H$ is identical for the high-refractive index layers and the thickness $d_1L$ is identical for the low-refractive index layers in the first dielectric film group, and wherein the refractive index $n_1H$ is identical for the high-refractive index layers and the refractive index $n_1L$ is identical for the low-refractive index layers, and a second dielectric film group including at least three high-refractive index layers (refractive index $n_2H$, thickness $d_2H$) and at least three low-refractive index layers (refractive index $n_2L$, thickness $d_2L$), respectively, which is adjacent to a surface of the first dielectric film group on a side of the first dielectric film group that is opposite to the support, wherein the thickness $d_2H$ is identical for the high-refractive index layers and the thickness $d_2L$ is identical for the low-refractive index layers in the second dielectric film group, and wherein the refractive index $n_2H$ is identical for the high-refractive index layers and the refractive index $n_2L$ is identical for the low-refractive index layers, wherein the dielectric multilayer film group set satisfies:

$$1.10 \geq d_2H/d_1H > 1 \text{ and}$$

$$1.10 \geq d_2L/d_1L > 1, \text{ and} \quad \text{[Mathematical Formula 2]}$$

wherein the near-infrared reflective film reflects near infrared light between the range of 800 nm and 1300 nm and transmits visible light within the range of 400 nm to 740 nm.

2. The near-infrared reflective film according to claim 1, wherein the optical film thickness of the high-refractive index layer (d1H×n1H) and the optical film thickness of the low-refractive index layer (d1L×n1L) of the first dielectric film group satisfy:

$$1.06 \geq (d_1H \times n_1H)/(d_1L \times n_1L) > 1 \text{ or}$$

$$1 > (d_1H \times n_1H)/(d_1L \times n_1L) \geq 0.94, \text{ and/or} \quad \text{[Mathematical Formula 3]}$$

the optical film thickness of the high-refractive index layer (d2H×n2H) and the optical film thickness of the low-refractive index layer (d2L×n2L) of the second dielectric film group satisfy:

$$1.06 \geq (d_2H \times n_2H)/(d_2L \times n_2L) > 1 \text{ or}$$

$$1 > (d_2H \times n_2H)/(d_2L \times n_2L) \geq 0.94. \quad \text{[Mathematical Formula 4]}$$

3. The near-infrared reflective film according to claim 1, wherein the optical film thickness of the high-refractive index layer (d1H×n1H) of the first dielectric film group and the optical film thickness of the high-refractive index layer (d2H×n2H) of the second dielectric film group satisfy:

$$1.10 \geq (d_2H \times n_2H)/(d_1H \times n_1H) > 1.06, \text{ and/or} \quad \text{[Mathematical Formula 5]}$$

the optical film thickness of the low-refractive index layer ($d_1L \times n_1L$) of the first dielectric film group and the optical film thickness of the low-refractive index layer ($d_2L \times n_2L$) of the second dielectric film group satisfy:

$$1.10 \geq (d_2L \times n_2L)/(d_1L \times n_1L) > 1.06. \quad \text{[Mathematical Formula 6]}$$

4. The near-infrared reflective film according to claim 1, which has two or more of the dielectric film group sets.

5. The near-infrared reflective film according to claim 1, wherein the ratio of the refractive index nH of any of the high-refractive index layers to the refractive index nL of at least one of the low-refractive index layers adjacent to said high-refractive index layer satisfies:

$$2 > nH/nL \geq 1.1. \quad \text{[Mathematical Formula 7]}$$

6. The near-infrared reflective film according to claim 1, wherein the dielectric multilayer film comprises a resin.

7. The near-infrared reflective film according to claim 6, wherein the dielectric multilayer film further comprises metal oxide particles.

8. A near-infrared reflective glass being formed by the near-infrared reflective film set forth in claim 1, which is laminated to the surface of a glass plate.

9. The near-infrared reflective film according to claim 2, wherein the optical film thickness of the high-refractive index layer (d1H×n1H) of the first dielectric film group and the optical film thickness of the high-refractive index layer (d2H×n2H) of the second dielectric film group satisfy:

$$1.10 \geq (d_2H \times n_2H)/(d_1H \times n_1H) > 1.06, \text{ and/or} \quad \text{[Mathematical Formula 5]}$$

the optical film thickness of the low-refractive index layer ($d_1L \times n_1L$) of the first dielectric film group and the optical film thickness of the low-refractive index layer ($d_2L \times n_2L$) of the second dielectric film group satisfy:

$$1.10 \geq (d_2L \times n_2L)/(d_1L \times n_1L) > 1.06. \quad \text{[Mathematical Formula 6]}$$

10. The near-infrared reflective film according to claim 2, which has two or more of the dielectric film group sets.

11. The near-infrared reflective film according to claim 3, which has two or more of the dielectric film group sets.

12. The near-infrared reflective film according to claim 9, which has two or more of the dielectric film group sets.

13. The near-infrared reflective film according to claim 2, wherein the ratio of the refractive index nH of any of the high-refractive index layers to the refractive index nL of at least one of the low-refractive index layers adjacent to said high-refractive index layer satisfies:

$$2 > nH/nL \geq 1.1. \quad \text{[Mathematical Formula 7]}$$

14. The near-infrared reflective film according to claim 3, wherein the ratio of the refractive index nH of any of the high-refractive index layers to the refractive index nL of at least one of the low-refractive index layers adjacent to said high-refractive index layer satisfies:

$$2 > nH/nL \geq 1.1. \quad \text{[Mathematical Formula 7]}$$

15. The near-infrared reflective film according to claim 9, wherein the ratio of the refractive index nH of any of the high-refractive index layers to the refractive index nL of at least one of the low-refractive index layers adjacent to said high-refractive index layer satisfies:

$$2 > nH/nL \geq 1.1. \quad \text{[Mathematical Formula 7]}$$

16. The near-infrared reflective film according to claim 4, wherein the ratio of the refractive index nH of any of the high-refractive index layers to the refractive index nL of at least one of the low-refractive index layers adjacent to said high-refractive index layer satisfies:

$$2 > nH/nL \geq 1.1. \quad \text{[Mathematical Formula 7]}$$

17. The near-infrared reflective film according to claim 10, wherein the ratio of the refractive index nH of any of the high-refractive index layers to the refractive index nL of at least one of the low-refractive index layers adjacent to said high-refractive index layer satisfies:

$$2 > nH/nL \geq 1.1. \quad \text{[Mathematical Formula 7]}$$

18. The near-infrared reflective film according to claim 11, wherein the ratio of the refractive index nH of any of the high-refractive index layers to the refractive index nL of at least one of the low-refractive index layers adjacent to said high-refractive index layer satisfies:

$$2 > nH/nL \geq 1.1. \quad \text{[Mathematical Formula 7]}$$

19. The near-infrared reflective film according to claim 12, wherein the ratio of the refractive index nH of any of the high-refractive index layers to the refractive index nL of at least one of the low-refractive index layers adjacent to said high-refractive index layer satisfies:

$$2 > nH/nL \geq 1.1. \quad \text{[Mathematical Formula 7]}$$

20. The near-infrared reflective film according claims 2, wherein the dielectric multilayer film comprises a resin.

* * * * *